(12) United States Patent
Shimomura et al.

(10) Patent No.: US 7,554,709 B2
(45) Date of Patent: Jun. 30, 2009

(54) OPTICAL SCANNING APPARATUS AND IMAGE FORMING APPARATUS EMPLOYING THIS APPARATUS

(75) Inventors: Hidekazu Shimomura, Yokohama (JP); Ken Tanimura, Utsunomiya (JP); Hiroshi Sato, Utsunomiya (JP); Tokuji Takizawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/870,163

(22) Filed: Oct. 10, 2007

(65) Prior Publication Data
US 2008/0030565 A1    Feb. 7, 2008

Related U.S. Application Data

(62) Division of application No. 11/282,384, filed on Nov. 18, 2005, now Pat. No. 7,397,590.

(30) Foreign Application Priority Data
Dec. 16, 2004    (JP)    ............... 2004-364440

(51) Int. Cl.
*G02B 26/08*    (2006.01)

(52) U.S. Cl. .............. 359/205.1; 359/204.1; 359/204.4; 347/259

(58) Field of Classification Search ............... None
See application file for complete search history.

(56) References Cited

U.S. PATENT DOCUMENTS

| | | | |
|---|---|---|---|
| 6,094,286 A | 7/2000 | Kato | |
| 6,771,429 B2* | 8/2004 | Kawabata et al. | ........... 359/662 |
| 2003/0067861 A1* | 4/2003 | Kimura | ................. 369/112.26 |
| 2005/0045814 A1* | 3/2005 | Shimomura et al. | ......... 250/234 |

FOREIGN PATENT DOCUMENTS

| | | | |
|---|---|---|---|
| JP | 62-119513 A | 5/1987 | |
| JP | 10-68903 A | 3/1998 | |
| JP | 11-281911 A | 10/1999 | |
| JP | 2002-303810 A | 10/2002 | |

* cited by examiner

*Primary Examiner*—James Phan
(74) *Attorney, Agent, or Firm*—Canon U.S.A., Inc. I.P. Divison

(57) ABSTRACT

An optical scanning apparatus including a light source, deflection unit configured to deflect a light flux emitted by the light source, a first optical system configured to condense a divergent light flux emitted by the light source, a second optical system configured to focus the deflected light flux on a target scanning face, where the wavelength of the light flux is short, and the first and second optical systems include respective refractive optical elements.

21 Claims, 17 Drawing Sheets

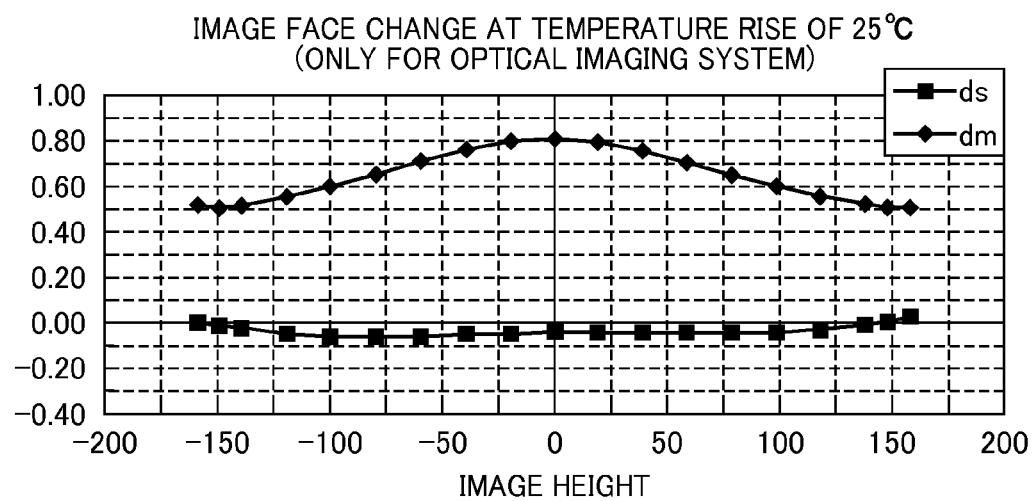
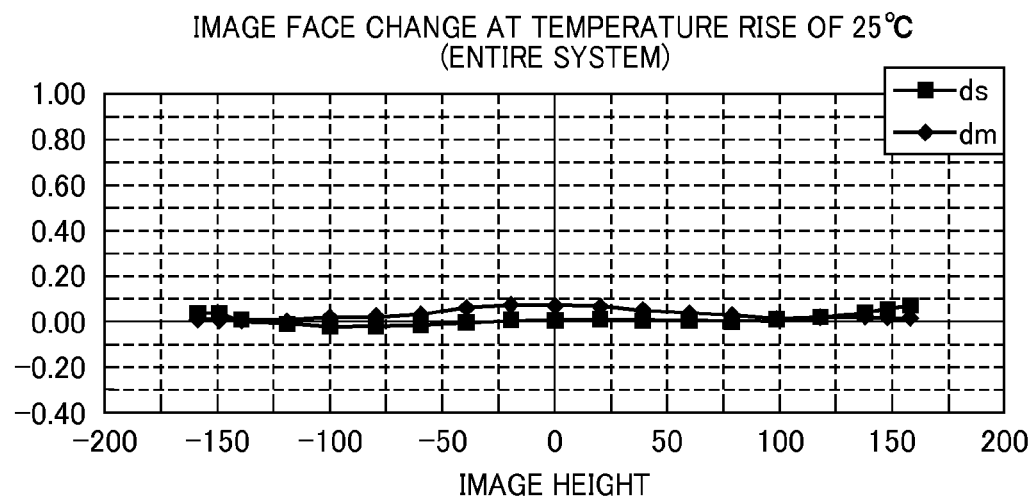

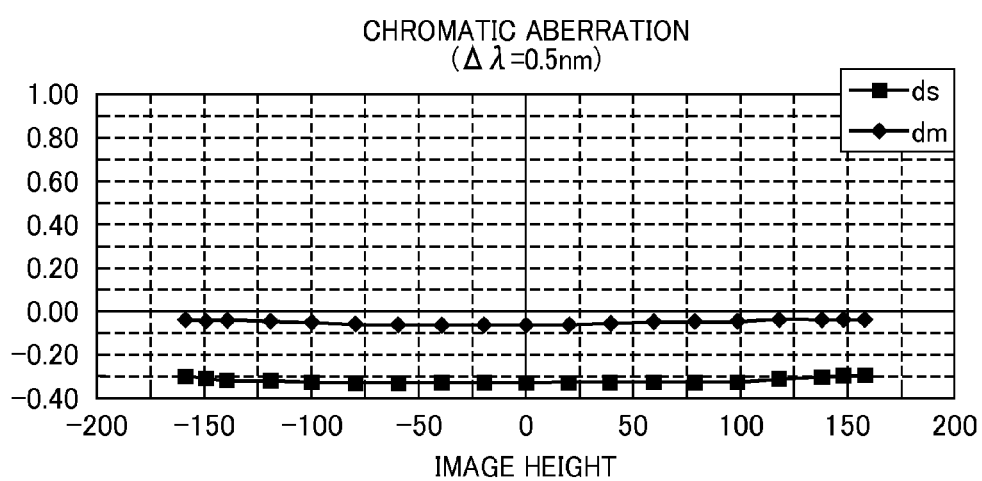

OPTICAL SCANNING APPARATUS AND IMAGE FORMING APPARATUS EMPLOYING THIS APPARATUS

CROSS-REFERENCE TO RELATED APPLICATIONS

This is a divisional of application Ser. No. 11/282,384 filed Nov. 18, 2005, now U.S. Pat. No. 7,397,590, which claims priority from Japanese Patent Application No. 2004-364440 filed Dec. 16, 2004, all of which are hereby incorporated by reference herein in their entirety.

BACKGROUND OF THE INVENTION

1. Field of the Invention

The present invention relates to an optical scanning apparatus, more particularly, although not exclusively, the present invention relates to an image forming device using an optical scanning apparatus.

2. Description of the Related Art

Conventionally, in an optical scanning apparatus, such as a laser beam printer (LBP), a light flux optically modulated and emitted by a light source in accordance with an image signal is periodically deflected by an optical deflector constituted, for example, by a polygon mirror, and converges as a spot on a photosensitive recording medium (a photosensitive drum) by an imaging optical system having a fθ characteristic. Then, the photosensitive recording medium is optically scanned to perform image recording.

FIG. 16 is a schematic diagram showing the essential portion of a conventional optical scanning apparatus.

In FIG. 16, a scattering light flux, which can be emitted by a light source 1, is converted, by a collimating lens 3, into substantially parallel light fluxes that are limited by a diaphragm 2 and enter a cylindrical lens 4 having a predetermined refracting power in the sub-scanning direction. Of the substantially parallel light fluxes that enter the cylindrical lens 4, the light fluxes that are discharged are unchanged in cross section in the main scanning direction, while in cross section in the sub-scanning direction, the light fluxes are converged and condensed substantially to a line image on a deflection face (a reflection face) 5a of a deflection portion 5, which is formed of a polygon mirror.

Then, the light fluxes deflected by the deflection face 5a of the deflection portion 5 are guided, via an imaging optical system 6 having an fθ characteristic, to a photosensitive drum face 8, a target scanning face. Thereafter, the deflection portion 5 is rotated in a direction indicated by an arrow A to optically scan the photosensitive drum 8 in a direction indicated by an arrow B. In this manner, image data are recorded.

For such an optical scanning apparatus, a method is discussed in Japanese Patent Laid-Open Publication No. Hei 10-68903 (corresponding to U.S. Pat. No. 6,094,286). According to this method, a magnification change and a focus change due to a temperature fluctuation in an optical scanning apparatus are corrected by I.) a power change between a plastic lens and a diffraction section, where the plastic lens is arranged between a polygon mirror and the face of a photosensitive drum, and II.) a wavelength change for a semiconductor laser.

Furthermore, conventionally, an infrared semiconductor laser (780 nm) or a red semiconductor laser (675 nm) has been employed as a light source. However, in response to a demand for higher resolutions and in order to obtain a tiny spot, an optical scanning apparatus has been developed that employs a short wave laser having an oscillating wavelength of 450 nm or shorter. A short wave laser, compared with a conventional optical scanning apparatus employing an infrared laser, can obtain a small spot having half the conventional diameter, while for an imaging optical system, the conventional emission F number is maintained. An optical scanning apparatus that employs a short wave laser is discussed, for example, in Japanese Patent Laid-Open Publication No. Hei 11-281911.

The use of a short wave laser having a wavelength of 450 nm or shorter is not discussed in Japanese Patent Laid-Open Publication No. Hei 10-68903 (U.S. Pat. No. 6,094,286).

An optical scanning apparatus that employs a short wave light source of 500 nm or shorter is discussed in Japanese Patent Laid-Open Publication No. 2002-303810. According to this optical scanning apparatus, an imaging position shift (a magnification color difference) that occurs in the main scanning direction, due to a wavelength change, is reduced by optimizing the power arrangement in the main scanning direction for at least one plastic lens and at least one diffraction surface, which are located between a polygon mirror and a photosensitive drum and which constitute an imaging optical system.

In order to use an optical scanning apparatus to perform accurate image data recording, the field curvature should be appropriately corrected across the entire scanning face, the isokinetic distortion characteristic (fθ characteristic) should be present between an angle of view θ and an image height Y, and the spot diameter on an image face should be uniform for each image height.

However, with an optical scanning apparatus that uses a short wave light source having a wavelength of 450 nm or shorter to obtain a spot having a diameter half that of a conventional spot, the following problem is encountered.

FIG. 17 is a cross-sectional view of an optical scanning apparatus, taken in the main scanning direction, that employs as a light source (not shown) a gallium nitride bluish violet laser (wavelength λ=405 nm). Two lenses in FIG. 17 are nonspherical lenses (e.g., made of plastic or other optical material as known by one of ordinary skill in the relevant art).

For an optical scanning apparatus using a conventional infrared laser, the spot diameter in the main scanning direction is set as 60 μm and the spot diameter in the sub-scanning direction is set as 70 μm. The depth of focus is shown in graphs in FIGS. 18 and 19 while slice levels are set as 75 μm in the main scanning direction and 85 μm in the sub-scanning direction. About ±5.0 mm is the distance in the defocusing direction on the image face, across the entire image height in the main scanning direction, on which a spot having a diameter of 75 μm or smaller is obtained. Similarly, about ±7.0 mm is the distance in the defocusing direction on the image face, across the entire image height in the sub-scanning direction, on which a spot having a diameter of 85 μm or smaller is obtained.

However, for an optical scanning apparatus using a short wave laser of 405 nm, the spot diameter set in the main scanning direction is 30 μm and the spot diameter set in the sub-scanning direction is 37.5 μm, when the slice levels set in the main scanning direction are 37.5 μm and in the sub-scanning direction are 42.5 μm, the depths of focus are about ±1.3 mm and about ±2.2 mm respectively in the main scanning direction and in the sub-scanning direction, as shown in FIGS. 20 and 21. This is because the depths of focus are proportional to the wavelength.

On the other hand, an inexpensive plastic lens that can quite arbitrarily be shaped is frequently employed as a scanning lens for an imaging optical system. The change rate for the refracting power of a plastic lens is higher than that of a glass lens, but as heat is generated by a polygon motor or a circuit board, for example, the refracting power is reduced, and accordingly, the focal position on a target scanning face is shifted. According to the conventional optical scanning apparatus shown in FIG. 17, when the environment temperature was changed 25° C., for example, the focus of the scanning lens (a plastic lens) was shifted away from the center of an image at a focal distance of 0.9 mm in the main scanning direction (dm) and at a focal distance of 1.3 mm in the sub-scanning direction (ds). In the graph in FIG. 22, the focal shifting of the optical lens (a plastic lens) that occurred when the temperature was raised 25° C. is plotted for each image height.

Efforts at spot size reduction can be made more difficult by focal shifting that can occur due to manufacturing errors during the production of an optical scanning apparatus that employs a short wave laser (450 nm or shorter), or by focal shifting that exceeds the depth of focus occurring in an environment wherein the temperature is raised Therefore, for an optical scanning apparatus that uses a short wave laser, the precision with which parts are produced and assembled can exceed that which is conventionally required, and the apparatus can exhibit superior environmental stability.

In Japanese Patent Laid-Open Publication No. Hei 11-281911, no reference is made to the above described shortcomings and the optical scanning apparatus disclosed in this document is available in a special environment, constantly maintained at a steady temperature, and this has a low degree of practicability.

According to the optical scanning apparatus disclosed in Japanese Patent Laid-Open Publication No. Hei 10-68903 (U.S. Pat. No. 6,094,286), a diffraction section is arranged between a polygon mirror and a photosensitive drum to compensate for focal shift that occurs due to an environmental temperature change.

Since a greater chromatic aberration occurs for the diffraction section, compared with the scanning lens, an optical design is required that takes into account not compensation for the temperature but also for the chromatic aberration.

In Japanese Patent Laid-Open Publication No. Hei 10-68903 (U.S. Pat. No. 6,094,286), a diffraction surface is also provided along an optical path between a light source and the polygon mirror; however, the use of a short wave laser (450 nm or shorter) for the optical scanning apparatus is not disclosed in Hei 10-68903.

That is, when a diffraction section is arranged between the polygon mirror and the photosensitive drum to compensate for a focal change that occurs due to the effect environmental temperature changes have on the scanning lens (a plastic lens), which is positioned between the polygon mirror and the photosensitive drum, a problem that a chromatic aberration is increased occurs.

According to the optical scanning apparatus in Japanese Patent Laid-Open Publication No. 2002-303810 that employs a short wave laser (450 nm or shorter), a diffraction surface is provided between a polygon mirror and a photosensitive drum to compensate for a magnification chromatic aberration that occurs in a scanning lens (a plastic lens). With this arrangement, focal changes due to environmental temperature changes can not be compensated for.

Further, in Japanese Patent Laid-Open Publication No. 2002-303810, the provision of a diffraction surface between a light source and the polygon mirror is not discussed.

Furthermore, for a collimating lens that converts laser light fluxes into substantially parallel light fluxes, the dispersive characteristic of the lens material is degraded as the wavelength is shortened, and the chromatic aberration becomes a possible problem.

In addition, for a multi-beam optical scanning apparatus for which the number of light sources (or light-emission points) is increased in accordance with a request for an increase in processing speed, a problem that can occur is when the wavelengths of the light sources do not match, one of the light sources can be out of focus, even though the others are in focus. Thus, even when light sources are selected so that the same wavelength difference is obtained, as in the case of a conventional infrared laser, an aberration can occur because, in the short wave region, the dispersive characteristic of the lens material is not satisfactory to avoid aberration effects.

As multi-beam optical scanning apparatuses is discussed in Japanese Patent Publication No. Hei 6-82172 that employs a polarized beam splitter and an apparatus that employs a monolithic multi-beam light source where multiple light emission points are present.

The above described conventional examples do not discuss any solutions for problems that have occurred when a short wave light source has been employed.

SUMMARY OF THE INVENTION

At least one exemplary embodiment is directed to an optical scanning apparatus that employs a short wave light source, having a wavelength of 450 nm or shorter, that constantly produces a tiny spot, even when an environmental temperature change occurs, and reduces a chromatic aberration that is caused by a variance in the laser wavelength, or by a wavelength change in the laser produced by the environmental temperature change. At least one further exemplary embodiment is related to an image forming apparatus that employs the optical scanning apparatus and that ensures the provision of a high grade image quality and environmental stability.

At least one exemplary embodiment is directed to an optical scanning apparatus used in an image forming apparatus, such as a laser beam printer or a digital copier that performs electrographic processing, where a light flux modulated and emitted by a light source is reflected and deflected by a deflection device and a polygon mirror, and by using this light, a target face is scanned, via an imaging optical system, to record image data.

At least one exemplary embodiment is directed to an optical scanning apparatus including: a light source; a deflection unit for deflecting a light flux emitted by the light source; a first optical system for condensing, at the deflection unit, a divergent light flux emitted by the light source; a second optical system for focusing, on a target scanning face, the light flux deflected by the deflection unit, where the wavelength of the light flux emitted by the light source is 450 nm or shorter, where at least one first refractive optical element (e.g., made of plastic or other optical material as known by one of ordinary skill in the relevant art) is arranged in the second optical system, and a first diffractive optical element having a diffraction surface is arranged along an optical path of the first optical system, and where power for the first refractive optical element in a main scanning direction and power for the diffraction surface of the first diffractive optical element in the main scanning direction have the same sign.

According to at least one exemplary embodiment, the first optical system includes a second refractive optical element having at least one lens, and power for the entire second refractive optical element in the main scanning direction is positive. When synthesis power for the first optical system is denoted by $\phi$, and power for an i-th lens that constitutes the second refractive optical element is denoted by $\phi_i$, the refractive index of the i-th lens that constitutes the second refractive optical element is denoted by $n_i$, a refractive index wavelength change rate for the i-th lens that constitutes the second refractive optical element is denoted by $dn_i/d\lambda$, the power for the diffraction surface of the first diffractive optical element in the main scanning direction is denoted by $\phi_{do}$, an imaging magnification of the optical scanning apparatus in the main scanning direction is denoted by $\beta$ and an emission F number for the second optical system in the main scanning direction is denoted by FNo., $$\left| -\frac{1}{\phi^2} \left( \sum \frac{\frac{dn_i}{d\lambda}}{n_i - 1} \phi_i + \sum \frac{\phi_{do}}{\lambda} \right) \times \beta^2 \right| < 0.5 \cdot FNo.^2 \cdot \lambda \cdot 10^{-6}$$

is established.

At least one further exemplary embodiment is directed to an optical scanning apparatus including: a light source; a deflection unit for deflecting a light flux emitted by the light source; a first optical system for condensing, at the deflection unit, a divergent light flux emitted by the light source; a second optical system for focusing, on a target scanning face, the light flux deflected by the deflection unit, where the wavelength of the light flux emitted by the light source is 450 nm or shorter, where at least one first refractive optical element (e.g., made of plastic or other optical material as known by one of ordinary skill in the relevant art) is arranged in the second optical system, and a second diffractive optical element (e.g., made of plastic or other optical material as known by one of ordinary skill in the relevant art) is arranged along an optical path of the first optical system, and where power for the first refractive optical element in a main scanning direction and power for the second diffractive optical element in the main scanning direction have the different sign.

In at least one exemplary embodiment, the first optical system includes a third refractive optical element having at least one lens, and where the power for the entire third refractive optical element in the main scanning direction is positive. When synthesis power for the first optical system is denoted by $\phi$, and the power for an i-th lens that constitutes the third refractive optical element is denoted by $\phi_i$, the refractive index for the i-th lens that constitutes the third refractive optical element is denoted by $n_i$, the change rate for the refractive index relative to the wavelength of the i-th lens that constitutes the third refractive optical element is denoted by $dn_i/d\lambda$, the power for a k-th lens that constitutes the second refractive optical element in the main scanning direction is denoted by $\phi_k$, the change rate for the refractive index relative to the wavelength of the k-th lens that constitutes the second refractive optical element is denoted by $dn_k/d\lambda$, an imaging magnification for the optical scanning apparatus in the main scanning direction is denoted by $\beta$ and an emission F number for the second optical system in the main scanning direction is denoted by FNo., $$\left| -\frac{1}{\phi^2} \left( \sum \frac{\frac{dn_i}{d\lambda}}{n_i - 1} \phi_i + \sum \frac{\frac{dn_k}{d\lambda}}{n_k - 1} \phi'_k \right) \times \beta^2 \right| < 0.5 \cdot FNo.^2 \cdot \lambda \cdot 10^{-6}$$

is established.

According to at least one exemplary embodiment where the optical scanning apparatus can use a short wave light source (450 nm or shorter), a plastic lens can be employed for an imaging optical system, and a diffractive optical element for which the power has the same sign as a plastic lens, or a plastic lens for which the power has a different sign is arranged between a light source and a deflection unit. With this arrangement, focal shifting in the main scanning direction that occurs due to an environmental temperature change can be compensated for.

Therefore, at least one exemplary embodiment is directed to an optical scanning apparatus providing a high grade image quality and high stability, even when the wavelength of a laser varies because of manufacturing errors, or fluctuates in response to a temperature change, a tiny spot diameter can be constantly maintained, and an image forming apparatus can be provided at a low cost.

Further features of the present invention will become apparent from the following description of exemplary embodiments (with reference to the attached drawings).

BRIEF DESCRIPTION OF THE DRAWINGS

FIG. 2 illustrates a graph showing the focal shifting distance of an imaging optical system in the first exemplary embodiment as the environment changes;

FIG. 3 illustrates a graph showing the focal shifting distance of the optical scanning apparatus of the first exemplary embodiment as the environment changes;

FIG. 4 illustrates a graph showing an axial chromatic aberration for the optical scanning apparatus according to the first exemplary embodiment;

DESCRIPTION OF THE EMBODIMENTS

Figure 1:
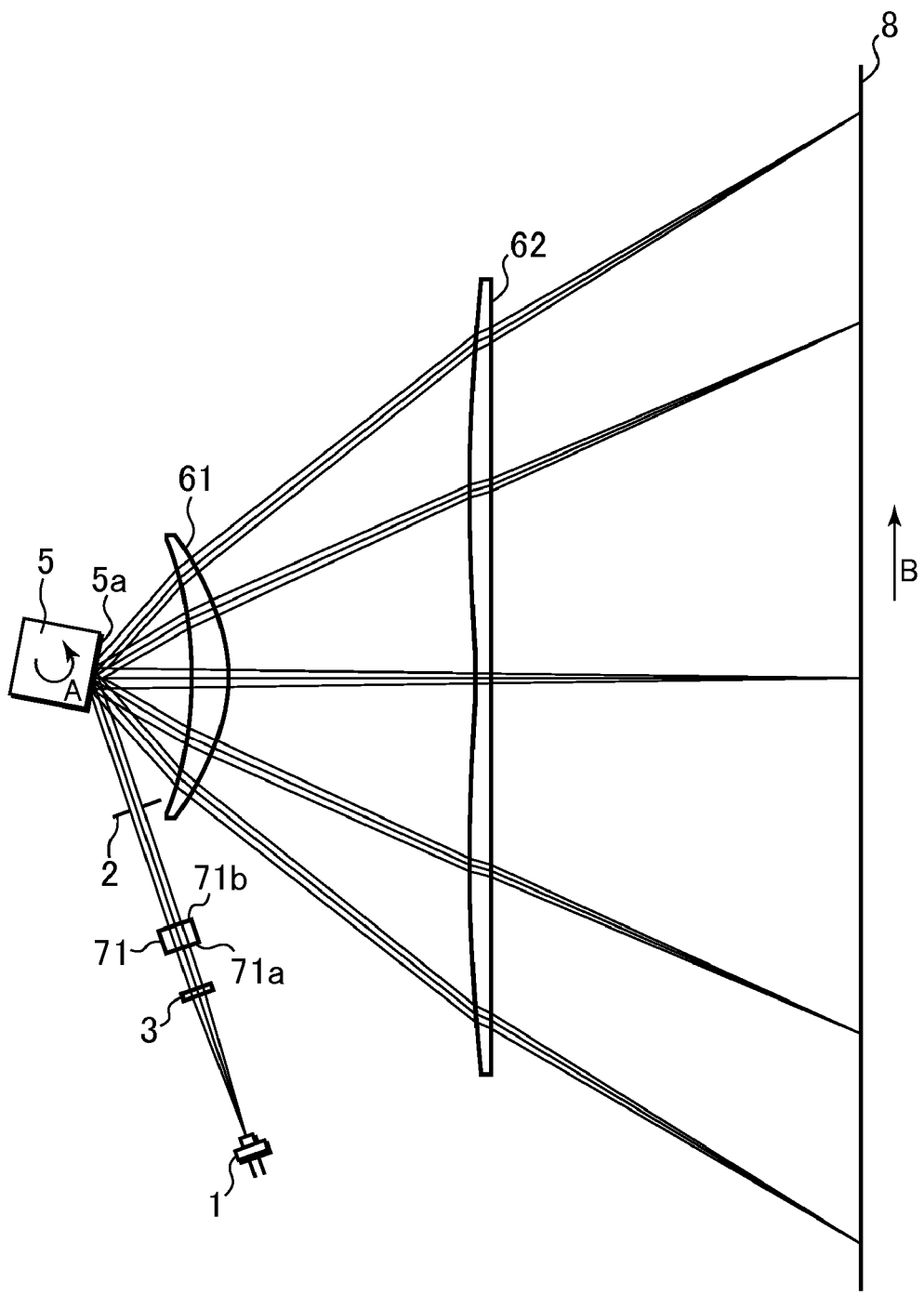
FIG. 1 illustrates a cross-sectional view of an optical scanning apparatus according to a first exemplary embodiment.

The following description of exemplary embodiment(s) is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate.

Additionally the actual size of optical elements may not be discussed however any size from macro lenses to nano lenses are intended to lie within the scope of exemplary embodiments (e.g., lenses with diameters of nanometer size, micro size, centimeter size, and meter sizes). Notice that similar reference numerals and letters refer to similar items in the following figures, and thus once an item is defined in one figure, it may not be discussed for following figures.

First Exemplary Embodiment 1

FIG. 1 illustrates a cross-sectional view of an optical scanning apparatus, according to a first exemplary embodiment, taken along the main scanning direction.

The main scanning direction is a direction perpendicular to the rotational axis of deflection device, and indicates the direction of a line scanned by the deflection device. The sub-scanning direction indicates a direction parallel to the rotational axis of the deflection device.

A main scanning cross section is defined as a plane that is parallel to the main scanning direction and that includes the light axis of an imaging optical system constituted by toric lenses (e.g., made of plastic or other optical material as known by one of ordinary skill in the relevant art) 61 and 62 (also as a plane that employs the rotational axis of the deflection device as a normal line).

A sub-scanning cross-section is defined as a plane that is substantially perpendicular to the main scanning cross-section and that includes the light axis of the imaging optical system constituted by the toric lenses (e.g., made of plastic or other optical material as known by one of ordinary skill in the relevant art) 61 and 62.

The power for the entire imaging optical system in the main scanning direction is positive, and the power for the entire imaging optical system in the sub-scanning direction is also positive.

The power for the toric lens (e.g., made of plastic or other optical material as known by one of ordinary skill in the relevant art) 61 in the main scanning direction and the power in the sub-scanning direction are both positive. The power for a first face of the toric lens 62 in the main scanning direction is negative, while the power for the first face of the toric lens 62 in the sub-scanning direction is nil.

The synthesis power in the main scanning direction for the two toric lenses 61 and 62 that constitute the imaging optical system is positive. Note in the following non-limiting examples the toric lenses 61 and 62 are plastic. However exemplary embodiments are not limited to plastic lenses, lenses 61 and 62 can be made of other optical materials as known by one of ordinary skill in the relevant art.

The synthesis power for a first optical system (an optical system from a light source 1 to a deflection unit 5) in the main scanning direction is positive.

The divergent light fluxes that are emitted by a semiconductor laser (one light emission portion), which can be the light source 1, is converted into parallel light fluxes by a collimating lens 3. Thereafter, the light flux width is limited by a diaphragm 2, so that a desired spot diameter can be obtained. A deflection unit 5 can include a four-faced polygon mirror (a multi-rotary mirror), and can be rotated by a drive device (not shown), (e.g., a motor), at a constant speed in a direction indicated by an arrow A in FIG. 1.

A mold lens (a refractive optical element) 71, for example made of plastic or other optical material as known by one of ordinary skill in the relevant art, has a predetermined refracting power in the sub-scanning direction, and an image is temporarily formed on a deflection face (a reflection face) 5a of the polygon mirror. The molded lens 71 can also serve as a temperature compensation optical device that can compensate for a focal shift of the plastic lens 61 due to an environmental change, and the focal shift of the diffractive optical element 62, on the plastic lens face of which a diffraction grating is formed. In the example discussed herein, the incidence plane is a saddle plane for which the curvature radius in the main scanning direction is −123.473 mm and the curvature radius in the sub-scanning direction is 128.591 mm, and the plane of emission is a diffraction plane across which an elliptic diffraction grating is formed.

The imaging optical system, constituted in the example by two plastic lenses having the fθ characteristic, i.e., the plastic lens 61 and the diffractive optical element 62, on the plastic lens face of which a diffraction grating is formed. Using the imaging optical system, one deflected light flux, which is reflected and deflected by the deflection unit 5, is focused on a photosensitive drum face 8 that is a target scanning face, and slanting of the deflection face 5a of the deflection unit 5 is corrected. At this time, the light flux, which has been reflected and deflected by the deflection face of the deflection unit 5, is guided to the photosensitive drum face 8 through the diffractive optical element 62, on the plastic lens face of which a diffraction grating is formed. Thus, as the polygon mirror of the deflection unit 5 is rotated in the direction indicated by the arrow A, the photosensitive drum face 8 is optically scanned in a direction indicated by an arrow B. As a result, scan lines are formed on the photosensitive drum face 8 and image recording is performed.

An optical arrangement and a face shape for this example of the exemplary embodiment are shown in Table 1.

TABLE 1

Design Data

Wavelength, Refractive Index

| | | |
|---|---|---|
| Wavelength Employed | $\lambda$(nm) | 405 |
| Lens Material | | |
| Collimating Lens (S-LAH66 by OHARA Co., Ltd.) | | |
| Refractive Index | n | 1.79908 |
| Refractive Index Wavelength Change Rate | $dn/d\lambda$ | $-2.60.E-04$ |
| Refractive Index Temperature Change Rate | $dn/dt$ | $5.70.E-06$ |
| Temperature compensation Optical Device, Toric Lens, Composite Optical Device | | |
| Refractive Index | n | 1.54662 |
| Refractive Index Wavelength Change Rate | $dn/d\lambda$ | $-1.67182.E-04$ |
| Refractive Index Temperature Change Rate | $dn/dt$ | $-7.98793.E-05$ |

Arrangement

| | | |
|---|---|---|
| Laser Incident Angle (Degrees) | | $-70$ |
| Maximum Light Emission Angle (Degrees) | | $\pm 48$ |
| Polygon Center Coordinates (mm) | Main Scanning | $-6.411$ |
| | Sub-scanning | 3.172 |
| Polygon Plane Count | | 4 |
| Polygon, Outside Diameter (mm) | | $\phi 20$ |
| Diaphragm (Elliptic) Diameter (mm) | Main Scanning | 4.4 |
| | Sub-scanning | 1.5 |
| Distance Between Light Emission Point And Collimating Lens (Including LD Cover Glass) | | 42.83 |
| Collimating Lens Center Thickness | | 2 |
| Distance Between Collimating Lens And Temperature Compensation Optical Device | | 11.92 |
| Temperature Compensation Optical Device Center Thickness | | 7 |
| Distance Between Temperature Compensation Optical Device And Diaphragm | | 34.08 |
| Distance Between Diaphragm And Deflection Reference Point | | 40 |
| Distance Between Deflection Reference Point And Toric Lens 61 | | 30 |
| Toric Lens 61 Center Thickness | | 11 |
| Distance Between Toric Lens 61 And Toric Lens 62 | | 75 |
| Toric Lens 62 Center Thickness | | 5 |
| Distance Between Toric Lens 62 And Target Scanning Face | | 111 |
| Distance Between Deflection Reference Point And Target Scanning Face | | 232 |
| Effective Scanning Width | | 317 |

Face Shape

| | First Face | Second Face |
|---|---|---|
| Collimating Lens 3 | | |
| R | 178.48 | $-43.18$ |
| Temperature Compensation Optical Device 71 Curvature Radius | | |
| R | $-123.473$ | $\infty$ |
| r | 128.591 | $\infty$ |
| Temperature Compensation Optical Device 71 Phase Function | | |
| b2 | | $-2.16958E-03$ |
| d0 | | $-4.64706E-03$ |

Suffics s is on the laser side
Suffics e is on the side opposite the laser side

TABLE 1-continued

Design Data

Toric Lens 61 Nonspherical Coefficient

| | First Face | Second Face |
|---|---|---|
| R | $-8.74966E+01$ | $-4.71453E+01$ |
| K | $5.71925E-01$ | $-1.04001E+00$ |
| B4 | $1.40393E-06$ | $9.40875E-08$ |
| B6 | $1.26075E-09$ | $5.42879E-10$ |
| B8 | $-1.16558E-12$ | $4.08844E-13$ |
| B10 | $1.96978E-16$ | $-4.10320E+16$ |
| r0 | $1.43515E+02$ | $-3.21543E+01$ |
| D2s | | $1.86868E-04$ |
| D4s | | $-1.07713E-07$ |
| D6s | | $5.27788E-11$ |
| D2e | | $2.46277E-04$ |
| D4e | | $-1.56775E-07$ |
| D6e | | $7.89931E-11$ |

Toric Lens 62

| | First Face | Second Face |
|---|---|---|
| Phase Function | | |
| b2 | | $-2.03948E-04$ |
| b4 | | $4.18305E-09$ |
| b6 | | $-6.91338E-13$ |
| b8 | | $5.18278E-17$ |
| b10 | | $-1.63713E-21$ |
| d0 | | $-6.75868E-03$ |
| d1 | | $9.16976E-07$ |
| d2 | | $1.68720E-07$ |
| d3 | | $-3.60713E-11$ |
| d4 | | $-5.48134E-12$ |
| d5 | | |
| d6 | | $8.82193E-17$ |
| Non-spherical Coefficient | | |
| R | $-4.04355E+02$ | $\infty$ |
| K | $-3.69841E+01$ | |
| B4 | $2.07946E-07$ | |
| B6 | $-1.81403E-11$ | |
| B8 | $8.57936E-16$ | |
| B10 | $-1.62040E-20$ | |
| r0 | $\infty$ | $\infty$ |
| D2s | | |
| D4s | | |
| D6s | | |
| D2e | | |
| D4e | | |
| D6e | | |

The generatrix shapes of the incident faces and the emission faces of the fθ lenses 61 and 62 are non-spherical that can be represented as a function of up to ten orders. When the intersection of the fθ lenses 61 and 62 and the light axis is regarded as the origin, and when the light axial direction is regarded as the X axis and the axis perpendicular to the light axis in the main scanning cross section is regarded as the Y axis, the direction of the generatrix corresponding to the main scanning direction can be represented by the following expression $$X = \frac{\frac{Y^2}{R}}{1 + \sqrt{1 - (1+k)\left(\frac{Y}{R}\right)^2}} + B4 \times Y^4 + B6 \times Y^6 + B8 \times Y^8 + B10 \times Y^{10}$$

(wherein R denotes a generatrix curvature radius and K, B4, B6, B8 and B10 denote non-spherical coefficients.)

Further, the sagittal direction corresponding to the sub-scanning direction can be represented by the following expression.

$$S = \frac{\frac{Z^2}{Rs^*}}{1+\sqrt{1-\left(\frac{Z}{Rs^*}\right)^2}}$$

In Expression 4, S denotes a directrix shape that includes the normal line of the generatrix at each location in the direction of the generatrix and that is defined in the plane substantially perpendicular to the main scanning cross section.

Also, Rs*, which is a curvature radius (directrix curvature radius) for the sub-scanning direction at a location at a distance Y from the light axis in the main scanning direction, can be represented as $$Rs^* = Rs \times (1 + D2 \times Y^2 + D4 \times Y^4 + D6 \times Y^6 + D8 \times Y^8 + D10 \times Y^{10})$$

(wherein Rs denotes a directrix curvature radius on a light axis, and D2, D4, D6, D8 and D10 denote directrix change coefficients).

Furthermore, for a diffraction surface, an expression is employed whereby the location in the main scanning direction can be represented by a phase function of up to ten orders, and the location in the sub-scanning direction can be represented by a quadratic phase function that varies depending on the location in the main scanning direction.

$$\phi = 2\pi m/\lambda \{b2Y^2 + b4Y^4 + b6Y^6 + b8Y^8 + b10Y^{10} + (d0 + d1Y + d2Y^2 + d3Y^3 + d4Y^4 + d5Y^5 + d6Y^6)Z^2\}$$

In this expression, $\phi$ denotes a phase function, m denotes a diffraction order (+1-order diffractive light can be used in the first to fourth exemplary embodiments), $\lambda$ denotes a wavelength (405 nm) that is employed, Y denotes the height from a lens light axis, and b2, b4, b6, b8, b10, d0, d1, d2, d3, d4, d5 and d6 denote phase coefficients.

In at least one exemplary embodiment, the face shape can be defined by the above described expressions; however, in other exemplary embodiments the face shape is not limited by the expressions.

According to this example of at least one exemplary embodiment, a short wave light source of $\lambda$=405 nm is employed, and across the entire effective scanning area, the spot diameter in the main scanning direction is 30 μm, while the spot diameter in the sub-scanning diameter is 35 μm (in this case, the spot diameter refers to a diameter obtained by slicing the beam using the peak quantity of $1/e^2$).

For the imaging optical system of this exemplary embodiment, the emission face 62a of the diffractive optical element 62, which can be a plastic device, is flat, and a diffraction grating is formed thereon. Compensation for magnification chromatic aberration is performed in the main scanning direction, and compensation for focal shifting (temperature compensation), which occurs due to a temperature change, is performed in the sub-scanning direction.

As for the diffraction surface 62, power in the main scanning direction and power in the sub-scanning direction are positive, and power for the entire imaging optical system in the main scanning direction and power for the diffraction surface 62 in the main scanning direction have the same sign.

Since the scanning lenses 61 and 62 are plastic lenses ZeonexE48R, produced by Japan Zeon Co., Ltd., focal shifting occurs by reducing the refractive index of the plastic material as the temperature rises. The focal shifting distance is canceled by the chromatic aberration at the diffraction grating that is generated by the wavelength temperature characteristic of the laser. The light source 1 used in this example of the exemplary embodiment is a gallium nitride, bluish violet semiconductor laser, and the temperature characteristic of the wavelength is d$\lambda$/dt=0.04 nm/° C. This value is mainly determined based on the physical properties of a semiconductor material. So long as a gallium nitride bluish violet semiconductor laser is optically designed while assuming a range of 0.03 (nm/° C.)<d$\lambda$/dt, 0.10 (nm/° C.), practically, there are no problems.

FIG. 2 illustrates a graph showing plotted focal shifting that occurred in the imaging optical system when the environment was changed ($\Delta$t=temperature rise of 25° C.). As described above, since temperature compensation is performed in the sub-scanning direction, almost no focal shifting occurs. However, since diffraction power in the main scanning direction is weak in the correction required for the magnification chromatic aberration, it is understood that almost no temperature compensation is performed.

When the power of the diffraction grating 62a is also set to perform temperature compensation in the main scanning direction, the correction required for the magnification chromatic aberration is exceeded.

In the first exemplary embodiment, one light flux can be emitted by the semiconductor laser 1 (one light emission portion). However, exemplary embodiments are not limited to one light flux and can also applied for a multi-beam semiconductor laser having two or more light emission portions.

For example, for an optical scanning apparatus that includes a multi-beam light source having two light emission portions, a problem is that the imaging magnification (fθ characteristic) of one light flux is shifted from that of the other light flux.

Generally, because of manufacturing errors a wavelength difference of ±3 nm can occur between the wavelengths of light fluxes that are emitted by a multi-beam light source, and a magnification chromatic aberration due to wavelength differences among multiple light fluxes becomes a problem.

That is, for a multi-beam semiconductor laser having two or more light emission portions, not the magnification chromatic aberration due to the initial wavelength fluctuation of one light flux that can be emitted by the semiconductor laser, but also a magnification chromatic aberration due to wavelength differences among the light fluxes that are emitted by different light emission portions should be taken into account.

Therefore, temperature compensation in the main scanning direction can be performed by a section other than the imaging optical systems 61 and 62.

Thus, to compensate for the focal shifting of the imaging optical system in the main scanning direction that occurs due to an environmental temperature change, the temperature compensation optical device 71 is introduced into the optical path extending from the light source 1 to the deflection unit 5. As described above, the incident face 71a of the temperature compensation optical device (a diffractive optical element) 71 is a refractive saddle surface, and has power in the main scanning direction and in the sub-scanning direction. The emission face 71b is a diffraction surface whereon a diffraction grating is formed so that power differs in the main scanning direction and in the sub-scanning direction. With this arrangement, no power is exerted in the main scanning direction, while power is exerted near the deflection face 5a in the sub-scanning direction so as to form a line image in the main scanning direction.

The power of the diffraction surface 71b in the main scanning direction is positive, and with this power, the focal shifting of the imaging optical system in the main scanning direction, which occurs due to an environmental temperature change, can be compensated for.

Since the synthetic power in the main scanning direction of the two lenses constituting the imaging optical system, i.e., the plastic lens 61 and the diffractive optical element 62, on the plastic lens face of which a diffraction grating is formed, is positive, the power of the diffraction surface 71b in the main scanning direction is also positive, in order to compensate for the focal shifting of the imaging optical system in the main scanning direction that occurs due to an environmental temperature change. Thus, the same sign is employed for the synthesis power in the main scanning direction of the plastic lens 61 and the diffractive optical element 62, on the plastic lens face of which a diffraction grating is formed, and the power of the diffraction surface 71b is in the main scanning direction.

If the power of the diffraction surface 71b in the main scanning direction were negative, when there was a change in the environmental temperature, the focal shifting distance of the optical scanning apparatus in the main scanning direction would be increased, and the power in that direction could not be used for compensation.

In this exemplary embodiment, since the temperature compensation optical device 71 is made of the same material (plastic) as the scanning lenses 61 and 62, the focal shifting caused by a rise in the temperature of the temperature compensation optical device 71 can also be compensated for. Therefore, diffraction power is also provided for the sub-scanning direction of the temperature compensation optical device 71, so that focal shifting, a result of a reduction in the refractive index of the plastic material that occurs as the temperature rises, is cancelled by using the chromatic aberration of the diffraction grating that is generated by the wavelength temperature characteristic of the laser.

FIG. 3 illustrates a graph showing plotted focal shifting that occurs, at the time of an environmental change (Δt=temperature rise of 25° C.), throughout the entire optical scanning system, to include the collimating lens 3, the temperature compensation optical device 71 and the scanning lenses 61 and 62 that constitute the imaging optical system.

Specifically, this graph shows the plotted focal shifting that occurs, at the time of an environmental change (Δt=temperature rise of 25° C.), at all the optical devices present along the optical path extending from the light source 1 to the target scanning face 8. It is understood that since the temperature compensation optical device 71 was introduced as described above, almost no focal shifting occurred in the main scanning direction and in the sub-scanning direction.

The power of the plastic lens 61 and the diffractive optical element 62, wherein a diffraction grating is formed on the plastic lens face, is changed as the refractive indexes of these lenses 61 and 62 are changed due to temperature fluctuation. The power of the plastic lens 61 and the diffractive optical element 62 is also changed because of the change in the wavelength of the light source (a semiconductor laser) 1 that occurs due to temperature fluctuation. Further, the power of the diffraction surface 71b of the diffractive optical element is changed as the wavelength of the light source (a semiconductor laser) 1 is changed due to the temperature fluctuation. A focus change that is caused by the changes in the power of the plastic lens 61 and the diffractive optical element 62 should be compensated for by a focus change that is the result of the power change at the diffraction surface 71b. Thus, the ratio of the synthesis power in the main scanning direction of the plastic lens 61 and the diffractive optical element 62 relative to the power in the main scanning direction of the diffraction surface 71b of the temperature compensation optical device 71 is set so as to compensate for such a focus change.

In this exemplary embodiment, a temperature compensation system is defined as a system for which, as shown in FIG. 3, the focal distance shifting, which occurs throughout the optical scanning system when the environment is changed (Δt=temperature rise of 25° C.), is limited so it does not to exceed a distance of 0.5 mm.

dm denotes an image face change distance (a focal shifting distance) in the main scanning direction, and ds denotes an image face change distance (a focal shifting distance) in the sub-scanning distance. M denotes the original direction, and S denotes the sagittal direction.

In FIGS. 2, 3 and 4, the image height along the horizontal axis represents the imaging position of a spot in the main scanning direction. The unit of image height is mm, as is the unit of the image face change distance along the vertical axis.

As described above, the focal shifting of the optical image system in the sub-scanning direction that occurs as a result of environmental change is corrected by the diffractive optical element 62, which has a diffraction surface and constitutes the imaging optical system, and the focal shifting of the imaging optical system in the main scanning direction is corrected by the temperature compensation optical device 71, which has a diffraction surface, that is located along the optical path extending from the light source 1 to the deflection unit 5. Further, the focal shifting in the sub-scanning direction, which is caused by a rise in the temperature of the temperature compensation optical device 71, is corrected by the diffractive optical element that provides, for the temperature compensation optical device 71, positive power in the sub-scanning direction.

In this manner, an optical system can be provided wherein focal shifting does not occur due to environmental fluctuation, even when the plastic lenses (refractive optical elements) 61 and 62 are employed for the imaging optical system. And since plastic lenses are employed, an inexpensive optical scanning apparatus can be provided.

Furthermore, the optical scanning apparatus in this example of the exemplary embodiment can satisfy the following expression (1).

$$\left| -\frac{1}{\phi^2} \left( \sum \frac{\frac{dn_i}{d\lambda}}{n_i - 1} \phi_i + \sum \frac{\phi_{do}}{\lambda} \right) \times \beta^2 \right| < 0.5 \cdot FNo.^2 \cdot \lambda \cdot 10^{-6} \quad \text{Ex. (1)}$$

In this expression, $\phi$ denotes a synthesis power in the main scanning direction of the optical system (first optical system), from the light source 1 to the deflection unit 1; $\phi_i$ denotes the power of the i-th lens that constitutes the collimating lens 3 that changes divergent light fluxes, emitted by the light source 1, into almost parallel light fluxes; $n_i$ denotes the refractive index of the i-th lens of the collimating lens 3; $dn_i/d\lambda$ denotes the refractive index wavelength change rate of the i-th lens of the collimating lens 3; $\phi_{do}$ denotes the main scanning power of a diffractive optical element face that is introduced into the first optical system; $\beta$ denotes the imaging magnification of the optical scanning apparatus in the main scanning direction; and FNo. denotes the emission F number of the imaging optical system in the main scanning direction.

In the example of the first exemplary embodiment, the collimating lens 3 is constituted by a single glass lens; however, exemplary embodiments are not limited to a single lens. Since the collimating lens 3 can be constituted by a plurality of lenses, "i-th lens" is employed in the above explanation. That is, i≧1 need be established, and i=2, 3, 4, . . . is available.

In this example of at least one exemplary embodiment, since $\phi=0.02244$, $\phi_i=0.02289$, $n_1=1.79908$, $dn_1/d\lambda=-2.60E-4$, $\phi_{do}=0.00434$, $\beta=4.24$, and FNo.=43.0, (left side)=0.117 and (right side)=0.375, so that expression (1) is satisfied.

The left side of expression (1) represents a quantity proportional to the chromatic aberration that is generated in the optical system (the first optical system) from the light source 1 to the deflection unit 5. The first term on the left side represents the chromatic aberration generated by the collimating lens 3, and the second term represents a chromatic aberration generated on the diffractive optical element face. The right side of expression (1) represents a quantity proportional to the depth of focus of the imaging optical system. When appropriate values are substituted into and establishes expression (1), the chromatic aberration occurring in the diffractive optical element, which is introduced to compensate for the focal shifting that is due to the rise in temperature, is corrected by the chromatic aberration occurring in the collimating lens. Thus, a high grade, high image quality optical scanning apparatus having high stability can be provided wherein a tiny spot diameter is constantly maintained, regardless of whether there is a variance in the wavelength of the laser or whether the wavelength of the laser is changed due to environmental fluctuation. Therefore, when a diffractive optical element is selected as the temperature compensation optical device 71 that compensates for the focal shifting, in the main scanning direction, that occurs at the scanning lenses 61 and 62, at least one exemplary embodiment has a collimating lens 3 with an average Abbe number that is small, and with a lens material that can be selected within a range of 25<ν<55.

The left side of expression (1) is obtained by employing the following procedures.

When f (f>0) defines the synthesis focal distance of the first optical system (the optical system from the light source 1 to the deflection unit 5) in the main scanning direction, and f′ defines a synthesis focal distance when the temperature rises 1° C., the following is a focal shifting distance (axial chromatic aberration distance) Δx (mm/° C.) for the first optical system in the main scanning direction when the temperature rises 1° C.

$$\Delta x = f' - f$$
$$= 1/\varphi' - 1/\varphi$$
$$\approx -(1/\varphi^2) \cdot \Delta\varphi \text{ (mm/° C.)}$$

Ex. A wherein Δϕ denotes a change in the power of the first optical system in the main scanning direction when the temperature rises 1° C.

Further, $\Delta\phi(1/(\text{mm}\cdot°\text{C.}))$ can be represented by separating into power $\phi_i$, for the imaging optical system, and power $\phi_{do}$, for the temperature compensation optical device 71, as follows.

$$\Delta\varphi = \frac{d\varphi_i}{dt} + \frac{d\varphi_{do}}{dt}$$
$$= \varphi_i \cdot \left(\frac{dn_i}{d\lambda}\right) \cdot \left(\frac{d\lambda}{dt}\right) / (n_i - 1) + \varphi_{do} \cdot \left(\frac{d\lambda}{dt}\right) / \lambda$$
$$= \left\{\varphi_i \cdot \left(\frac{dn_i}{d\lambda}\right) + \varphi_{do}/\lambda\right\} \cdot \left(\frac{d\lambda}{dt}\right) (1/(\text{mm}\cdot°\text{C.}))$$

Ex. B

Assuming that a gallium nitride bluish violet *semiconductor* laser is employed as the light source 1, and that dλ/dt=0.04 (nm/° C.) is substituted into Ex. B and the temperature rises 25° C., $$\Delta\varphi \cdot 25 = \left\{\varphi_i \cdot \left(\frac{dn_i}{d\lambda}\right) + \varphi_{do}/\lambda\right\} \cdot 0.04 \cdot 25$$
$$= \left\{\varphi_i \cdot \left(\frac{dn_i}{d\lambda}\right) + \varphi_{do}/\lambda\right\} (1/\text{mm})$$

Ex. C

Further, when β defines the imaging magnification for the entire optical scanning apparatus in the main scanning direction, in accordance with Ex. A and Ex. C, the focal shifting distance (the axial chromatic aberration distance) at the target scanning face when the temperature rises 25° C. is $$\Delta X = \Delta x \cdot 25 \cdot \beta^2$$
$$= -(1/\varphi^2) \cdot \left\{\sum \varphi_i \cdot \left(\frac{dn_i}{d\lambda}\right) + \sum \varphi_{do}/\lambda\right\} \cdot \beta^2 \text{ (mm)}$$

The right side of expression 1 represents a quantity proportional to the depth of focus of the imaging optical system 61 or 62.

When the emission F number for the imaging optical systems 61 or 62 in the main scanning direction is denoted by FNo, and the wavelength for the light source 1 is denoted by λ(nm), the depth of focus is proportional to $\text{FNo}^2 \cdot \lambda \cdot 10^{-6}$ (mm).

At the end, the numerical range of expression (1) is determined while taking into account the fact that the wavelength of the light source 1 is equal to or shorter than 450 nm and the temperature characteristic of the wavelength for the light source 1 is 0.03<dλ/dt<0.10. So long as this range is satisfied by expression (1), a high grade, high image quality optical scanning apparatus having high stability can be provided, wherein a chromatic aberration occurring in the diffractive optical element can be compensated for by using a chromatic aberration occurring in the collimating lens, and wherein a tiny spot diameter is constantly maintained when there is a variance in the wavelength of a laser or when there is a fluctuation in the wavelength of the laser due to the temperature change.

Incidentally, in this example of at least one exemplary embodiment, S-LAH66 (ν=49.6), produced by OHRA Co., Ltd., is employed as the collimating lens 3.

FIG. 4 illustrates a graph, plotted for each image height, showing the axial chromatic aberration that occurred upon the application of a wavelength difference of 0.5 nm. The chromatic aberration in the sub-scanning direction is greater than in the main scanning direction because the power of the diffractive optical element is high; but still the chromatic aberration can be managed and limited to a level wherein it presents practically no problem (within the depth of focus).

In this example of at least one exemplary embodiment, a semiconductor laser has been employed that has one light emission portion that can emit a single light flux. However, a light source, such as a surface emitting laser, having two or more light emission portions can also be employed in the exemplary embodiments.

In the first exemplary embodiment, the imaging optical system has been constituted by the two plastic lenses 61 and 62. However, the imaging optical system can be constituted by a single plastic lens (a dioptric optical device) for which the power, both in the main scanning direction and in the sub-scanning direction, is positive. Further, so long as at least one plastic lens is included in the imaging optical system, one or more glass fθ lenses can also be included to constitute this system.

The focal shifting of the glass fθ lens due to environmental temperature change is smaller than that of the plastic lens. Thus, when at least one exemplary embodiment is applied to an imaging optical system that includes one or more glass fθ lenses, the focal shifting of the plastic fθ lens due to environmental temperature change need be taken into account.

Second Exemplary Embodiment

Figure 5:
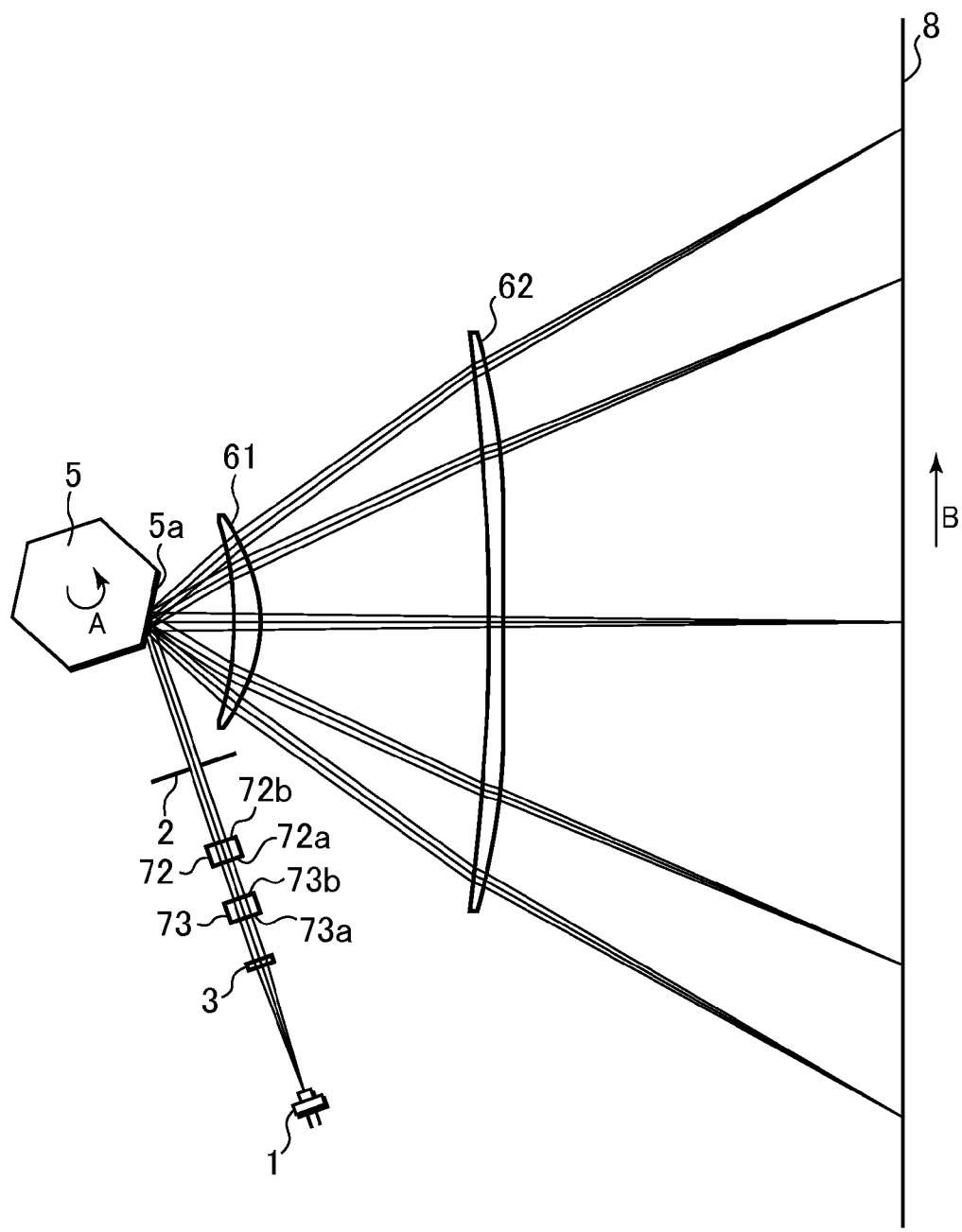
FIG. 5 illustrates a cross-sectional view of an optical scanning apparatus according to a second exemplary embodiment.

FIG. 5 illustrates a main-scanning cross-sectional view of an optical scanning apparatus according to a second exemplary embodiment.

A difference from the first exemplary embodiment is that the temperature compensation optical device 71 is divided into a cylinder lens 72, which has power in the sub-scanning direction, and a temperature compensation optical device (a diffractive optical element) 73, which performs temperature compensation in the main scanning direction. An incident face 73*a* of the temperature compensation optical device 73 is a cylinder face having negative power in the main scanning direction, and an emission face 73*b* is a diffraction surface, on the plane of which is formed a diffraction grating having positive power in the main scanning direction.

A plastic lens 61, and a diffractive optical element 62, on the plastic lens face of which a diffraction grating is formed, constitute an imaging optical system. Since these components provide the same functions as explained in the first exemplary embodiment, no further explanation for them will be given. Further, a gallium nitride bluish violet semiconductor laser (dλ/dt=0.04 nm/° C.), as used in the first exemplary embodiment, is employed as a light source 1.

An optical arrangement and a face shape for this example of the exemplary embodiment are shown in Table 2.

TABLE 2

| Design Data | | | |
|---|---|---|---|
| Wavelength, Refractive Index | | | |
| Wavelength Employed | λ(nm) | 405 | |
| Lens Material | | | |
| Collimating Lens, Sub-Scanning Cylinder Lens | | | |
| (S-LAH60 by OHARA Co., Ltd.) | | | |
| Refractive Index | n | 1.87382 | |
| Refractive Index Wavelength Change Rate | dn/dλ | −4.10.E−04 | |
| Refractive Index Temperature Change Rate | dn/dt | 1.01.E−05 | |
| Temperature compensation Optical Device, Toric Lens, Composite Optical Device | | | |
| Refractive Index | n | 1.54662 | |
| Refractive Index Wavelength | dn/dλ | −1.67182.E−04 | |

TABLE 2-continued

| Design Data | | | |
|---|---|---|---|
| Change Rate | | | |
| Refractive Index Temperature Change Rate | dn/dt | | −7.98793.E−05 |
| Arrangement | | | |
| Laser Incident Angle (Degrees) | | | −70 |
| Maximum Light Emission Angle (Degrees) | | | ±42 |
| Polygon Center Coordinates (mm) | Main Scanning | | −15.10997 |
| | Sub-scanning | | 8.6181 |
| Polygon Plane Count | | | 6 |
| Polygon, Outside Diameter (mm) | | | φ40 |
| Diaphragm (Elliptic) Diameter (mm) | Main Scanning | | 4.96 |
| | Sub-scanning | | 1.24 |
| Distance Between Light Emission Point And Collimating Lens (Including LD Cover Glass) | | | 42.83 |
| Collimating Lens Center Thickness | | | 2 |
| Distance Between Collimating Lens And Temperature Compensation Optical Device | | | 12 |
| Temperature Compensation Optical Device Center Thickness | | | 7 |
| Distance Between Temperature Compensation Optical Device And Sub-Scanning Cylinder Lens | | | 11 |
| Sub-Scanning Cylinder Lens Center Thickness | | | 7 |
| Distance Between Sub-Scanning Cylinder Lens And Diaphragm | | | 26 |
| Distance Between Diaphragm And Deflection Reference Point | | | 50 |
| Distance Between Deflection Reference Point And Toric Lens 61 | | | 30 |
| Toric Lens 61 Center Thickness | | | 8 |
| Distance Between Toric Lens 61 And Toric Lens 62 | | | 78 |
| Toric Lens 62 Center Thickness | | | 5.5 |
| Distance Between Toric Lens 62 And Target Scanning Face | | | 135.5 |
| Distance Between Deflection Reference Point And Target Scanning Face | | | 257 |
| Effective Scanning Width | | | 312 |
| Face Shape | | | |
| | First Face | | Second Face |
| Collimating Lens 3 | | | |
| R | 183.19225 | | −47.97820 |
| Temperature Compensation Optical Device 73 Curvature Radius | | | |
| R | −120.1750 | | ∞ |
| r | ∞ | | ∞ |
| Temperature Compensation Optical Device 73 Phase Function | | | |
| b2 | | | −2.24322E−03 |
| d0 | | | |
| Sub-Scanning Cylinder Lens 72 Curvature Radius | | | |
| R | ∞ | | ∞ |
| r | 68.8008 | | ∞ |
| Toric Lens 61 Nonspherical Coefficient | | | |
| | First Face | | Second Face |
| R | −6.66315E+01 | | −4.32247E+01 |
| K | −1.20676E+00 | | −1.17827E+00 |
| B4 | 2.21574E−06 | | 5.39830E−07 |
| B6 | −9.23382E−11 | | 7.07201E−10 |

TABLE 2-continued

Design Data

| | | |
|---|---|---|
| B8 | −6.16766E−14 | −2.54874E−13 |
| B10 | 1.62177E−16 | 2.57739E−16 |
| r0 | ∞ | ∞ |
| D2s | | |
| D4s | | |
| D6s | | |
| D2e | | |
| D4e | | |
| D6e | | |

Toric Lens 62

| | First Face | Second Face |
|---|---|---|
| Phase Function | | |
| b2 | −1.873030E−04 | |
| b4 | 2.314580E−08 | |
| b6 | −7.233740E−12 | |
| b8 | 9.527280E−16 | |
| b10 | −4.796180E−20 | |
| d0 | −4.916420E−03 | |
| d1 | 1.039814E−07 | |
| d2 | 1.521892E−07 | |
| d3 | 3.969140E−11 | |
| d4 | −2.684900E−12 | |
| d5 | | |
| d6 | | |

Suffics s is on the laser side
Suffics e is on the side opposite the laser side

Non-spherical Coefficient

| | | |
|---|---|---|
| R | −6.67480E+02 | −2.71371E+04 |
| K | | −6.38436+11 |
| B4 | | −2.71246E−07 |
| B6 | | 3.29363E−11 |
| B8 | | −3.07836E−15 |
| B10 | | 1.28535E−19 |
| r0 | ∞ | −8.63115E+01 |
| D2s | | 4.03490E−05 |
| D4$_R$ | | 3.62154E−09 |
| D6s | | −4.31792E−12 |
| D8s | | 8.63612E−16 |
| D10s | | −5.41252E−20 |
| D2e | | 5.85138E−05 |
| D4e | | −9.23187E−09 |
| D6e | | 2.08091E−13 |
| D8e | | 1.66734E−16 |
| D10e | | −1.66814E−20 |

Figure 6:
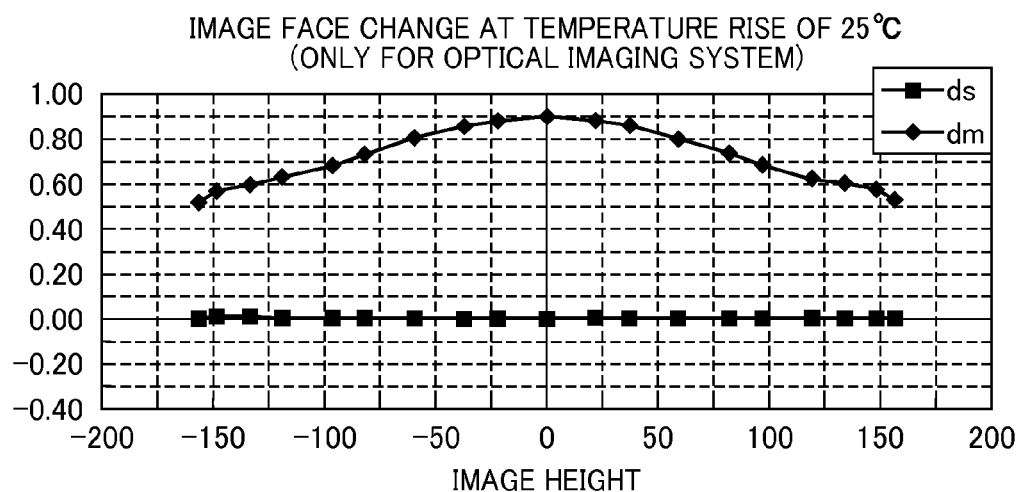
FIG. 6 illustrates a graph showing the focal shifting distance of an imaging optical system in the second exemplary embodiment as an environment is changed.

FIG. 6 illustrates a graph showing a plotted focal shift that, as the environment fluctuated (Δt=temperature rise of 25° C.), occurred in the imaging optical system. Since, as in the first exemplary embodiment, temperature compensation is performed for the imaging optical system in the sub-scanning direction, focal shifting does not occur in the sub-scanning direction. However, since in the main scanning direction diffraction power is weak, enough to compensate for the magnification chromatic aberration, almost no temperature compensation is performed.

Figure 7:
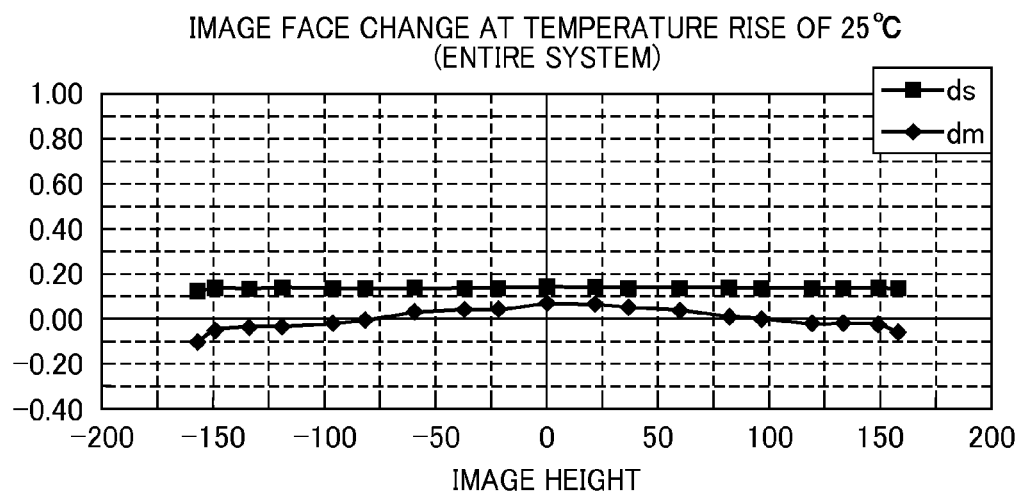
FIG. 7 illustrates a graph showing the focal shifting distance of the optical scanning apparatus of the second exemplary embodiment as the environment changes.

FIG. 7 illustrates a graph showing a plotted focal shift that occurred, at the time of the environmental change (Δt=temperature rise of 25° C.), throughout the entire optical scanning system, which includes the collimating lens 3, the temperature compensation optical device (diffractive optical element) 73, the sub-scanning cylinder lens 72, the plastic lens 61, and the diffractive optical element 62, on the plastic lens face of which a diffraction grating is formed. Since the temperature compensation optical device 73 was arranged as described above, it is understood that almost no focal shifting occurred in the main scanning direction and in the sub-scanning direction.

As described above, the focal shifting of the imaging optical system in the sub-scanning direction, which occurred due to the environmental change, was compensated for by the diffractive optical element 62 that is arranged in the imaging optical system. And the focal shifting of the imaging optical system in the main scanning direction was compensated for by the diffractive optical element (temperature compensation optical device) 73 that is located along the optical path extending from the light source 1 to the deflection unit 5.

With such an optical system, wherein the imaging optical system is constituted by the plastic lens 61 and the diffractive optical element 62, on the plastic lens face of which a diffraction grating is formed, focal shifting does not occur due to environmental change. Furthermore, since plastic lenses are employed, an inexpensive optical scanning apparatus can be provided.

The optical scanning apparatus of this exemplary embodiment, as well as that in the first exemplary embodiment, can satisfy expression (1).

In the example of the second exemplary embodiment, since $\phi=0.02245$, $\phi_1=0.02289$, $n_1=1.87382$, $dn_1/d\lambda=-4.10E-4$, $\phi_{do}=0.00449$, $\beta=4.78$, and FNo.=42.9, (left side)=0.015 and (right side)=0.372, expression (1) is satisfied. The lens material for the collimating lens 3 used for the example of the second exemplary embodiment is S-LAH60, produced by OHARA Co., Ltd. ($\nu$=37.16).

Figure 8:
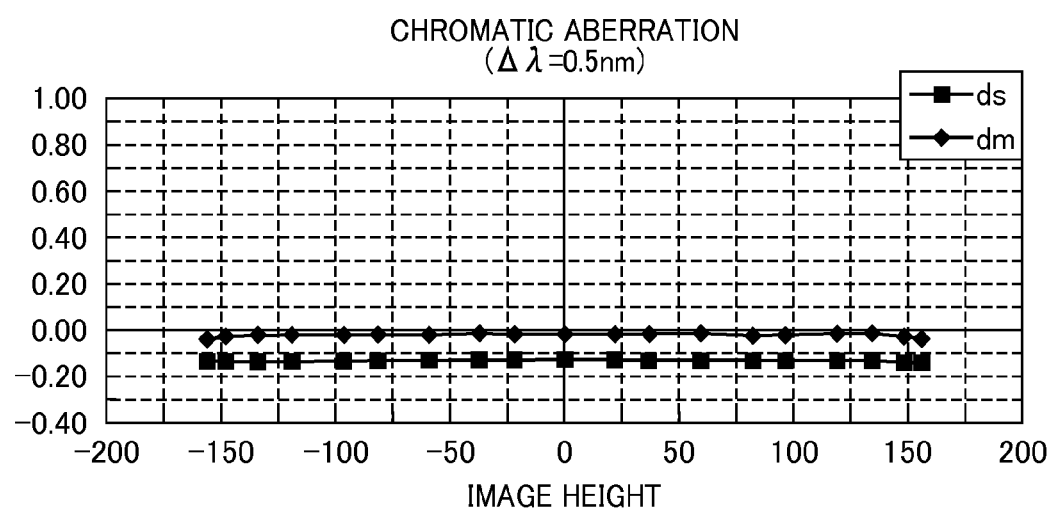
FIG. 8 illustrates a graph showing an axial chromatic aberration for the optical scanning apparatus according to the second exemplary embodiment.

FIG. 8 illustrates a graph showing the axial chromatic aberration, plotted for each image height, that was obtained upon the application of a wavelength difference of 0.5 nm. Since an appropriate material for the collimating lens, an appropriate power for the diffractive optical element and an appropriate imaging magnification for the optical scanning apparatus are designated, the temperature compensation can be performed and the chromatic aberration can be managed and limited to a level wherein it presents practically no problem (within the depth of focus).

Third Exemplary Embodiment

Figure 9:
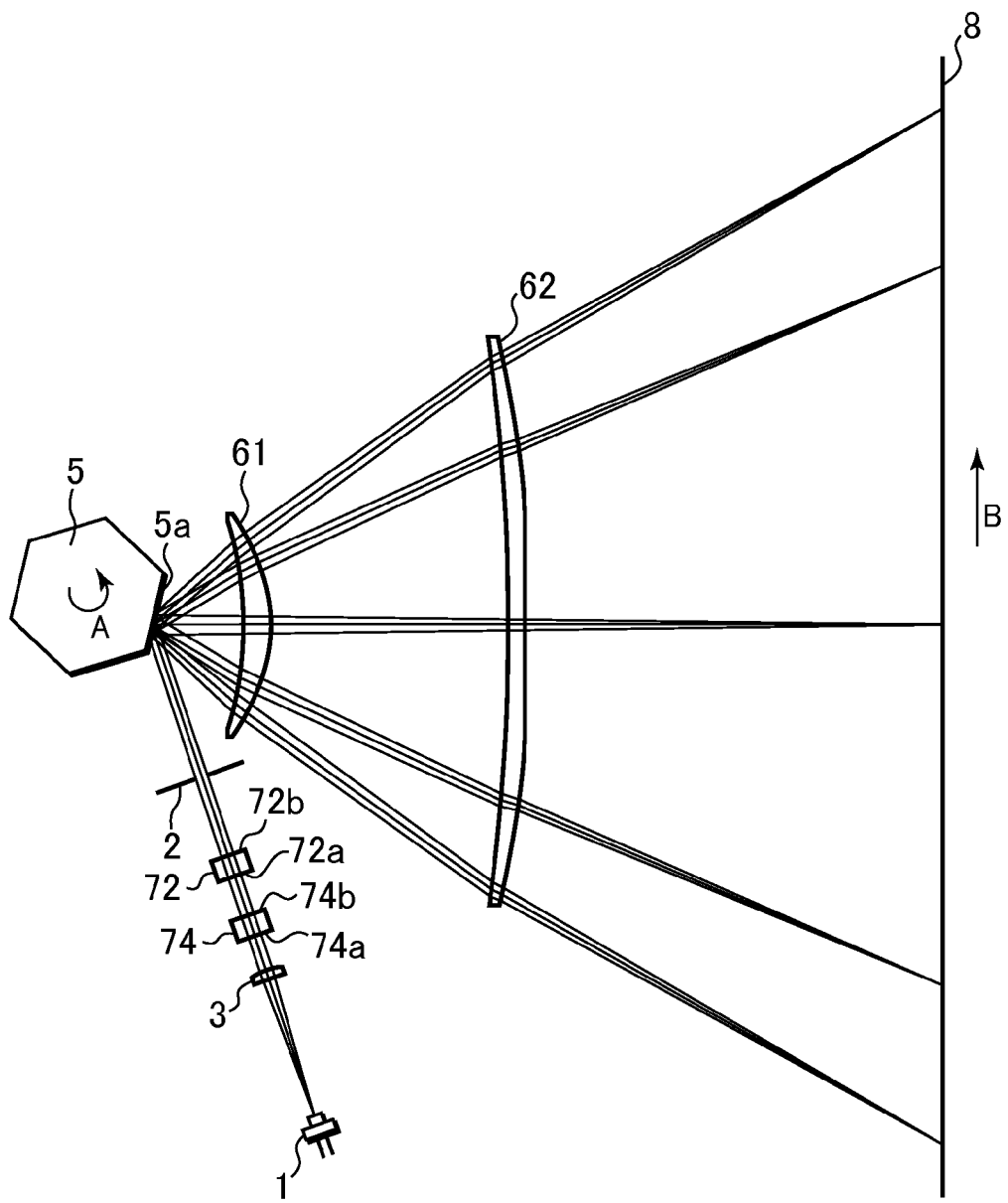
FIG. 9 illustrates a cross-sectional view of an optical scanning apparatus according to a third exemplary embodiment.

FIG. 9 illustrates a main-scanning cross-sectional view of an optical scanning apparatus according to a third exemplary embodiment.

One difference between the third exemplary embodiment and the first exemplary embodiment is that in the third exemplary embodiment a temperature compensation optical device 71 is divided into a cylinder lens 72, which has power in the sub-scanning direction, and a temperature compensation optical device 74, which performs temperature compensation in the main scanning direction. An incident face 74a of the temperature compensation optical device 74 is a spherical face having negative refractive power, and an emission face 74b is a plane having no power. The temperature compensation optical device 74 is made of the same plastic material as the plastic lens 61 and the diffractive optical element 62, on the plastic lens face of which a diffraction grating is formed, that together constitute an imaging optical system. Unlike in the second exemplary embodiment, a diffraction plane is not prepared on the emission face of the temperature compensation optical device 74. Further, in this exemplary embodiment, a light flux emitted by a collimating lens is converged light, and when this light passes through the temperature compensation optical device 74, light fluxes parallel to the main scanning direction are emitted.

The synthesis power of the first optical system (the optical system extending from a light source 1 to a deflection unit 5) is positive.

Since the plastic lens 61 and the diffractive optical element 62, on the plastic lens face of which a diffraction grating is formed, that together constitute the imaging optical system, perform the same function as in the first exemplary embodiment, no further explanation for them will be given. Furthermore, a gallium nitride bluish violet semiconductor laser ($d\lambda/dt=0.04$ nm/° C.) used in the first and the second exemplary embodiments is also employed as the light source 1.

In the third exemplary embodiment, one light flux can be emitted by the semiconductor laser 1 (one light emission portion). However, exemplary embodiments can also be applied for a multi-beam semiconductor laser having two or more light emission portions.

For example, for an optical scanning apparatus that includes a multi-beam light source having two light emission portions, a problem is that the imaging magnification (the fθ characteristic) of one light flux is shifted from that of the other light flux.

Generally, because of manufacturing errors, there will be differences of ±3 nm between the wavelengths of the light fluxes that are emitted by a multi-beam light source, and due to these light flux wavelength differences, a magnification chromatic aberration will become a problem.

That is, for a multi-beam semiconductor laser having two or more light emission portions, not only should a magnification chromatic aberration due to the initial wavelength fluctuation of one light flux emitted by the semiconductor laser be taken into account, but also a magnification chromatic aberration due to wavelength differences between the light fluxes that are emitted by different light emission portions.

An optical arrangement and a face shape for this example of the exemplary embodiment are shown in Table 3.

TABLE 3

| Design Data | | |
|---|---|---|
| Wavelength, Refractive Index | | |
| Wavelength Employed | λ(nm) | 405 |
| Lens Material | | |
| Collimating Lens (S-BSL7 by OHARA Co., Ltd.) | | |
| Refractive Index | n | 1.52972 |
| Refractive Index Wavelength Change Rate | dn/dλ | −1.20.E−04 |
| Refractive Index Temperature Change Rate | dn/dt | 3.30.E−06 |
| Sub-Scanning Cylinder Lens (S-LAH60 By OHARA Co., Ltd.) | | |
| Refractive Index | n | 1.87382 |
| Refractive Index Wavelength Change Rate | dn/dλ | −4.10.E−04 |
| Refractive Index Temperature Change Rate | dn/dt | 1.01.E−05 |
| Temperature compensation Optical Device, Toric Lens, Composite Optical Device | | |
| Refractive Index | n | 1.54662 |
| Refractive Index Wavelength Change Rate | dn/dλ | −1.67182.E−04 |
| Refractive Index Temperature Change Rate | dn/dt | −7.98793.E−05 |
| Arrangement | | |
| Laser Incident Angle (Degrees) | | −70 |
| Maximum Light Emission Angle (Degrees) | | ±42 |
| Polygon Center Coordinates (mm) | Main Scanning | −15.10997 |
| | Sub-scanning | 8.6181 |

TABLE 3-continued

| Design Data | | |
|---|---|---|
| Polygon Plane Count | | 6 |
| Polygon, Outside Diameter (mm) | | φ40 |
| Diaphragm (Elliptic) Diameter (mm) | Main Scanning | 4.96 |
| | Sub-scanning | 1.12 |
| Distance Between Light Emission Point And Collimating Lens (Including LD Cover Glass) | | 42.83 |
| Collimating Lens Center Thickness | | 2 |
| Distance Between Collimating Lens And Temperature Compensation Optical Device | | 12 |
| Temperature Compensation Optical Device Center Thickness | | 7 |
| Distance Between Temperature Compensation Optical Device And Sub-Scanning Cylinder Lens | | 11 |
| Sub-Scanning Cylinder Lens Center Thickness | | 7 |
| Distance Between Sub-Scanning Cylinder Lens And Diaphragm | | 26 |
| Distance Between Diaphragm And Deflection Reference Point | | 50 |
| Distance Between Deflection Reference Point And Toric Lens 61 | | 30 |
| Toric Lens 61 Center Thickness | | 8 |
| Distance Between Toric Lens 61 And Toric Lens 62 | | 78 |
| Toric Lens 62 Center Thickness | | 5.5 |
| Distance Between Toric Lens 62 And Target Scanning Face | | 135.5 |
| Distance Between Deflection Reference Point And Target Scanning Face | | 257 |
| Effective Scanning Width | | 312 |

| Face Shape | | |
|---|---|---|
| | First Face | Second Face |
| Collimating Lens 3A | | |
| R | 183.19225 | −20.16601 |
| Temperature Compensation Optical Device 74 Curvature Radius | | |
| R | −79.400 | ∞ |
| r | −79.400 | ∞ |
| Sub-Scanning Cylinder Lens 72 Curvature Radius | | |
| R | ∞ | ∞ |
| r | 68.7 | ∞ |
| Toric Lens 61 Nonspherical Coefficient | | |
| | First Face | Second Face |
| R | −6.66315E+01 | −4.32247E+01 |
| K | −1.20676E+00 | −1.17827E+00 |
| B4 | 2.21574E−06 | 5.39830E−07 |
| B6 | −9.23382E−11 | 7.07201E−10 |
| B8 | −6.16766E−14 | −2.54874E−13 |
| B10 | 1.62177E−16 | 2.57739E−16 |
| r0 | ∞ | ∞ |
| D2s | | |
| D4s | | |
| D6s | | |
| D2e | | |
| D4e | | |
| D6e | | |

TABLE 3-continued

Design Data

Toric Lens 62

| | First Face | Second Face |
|---|---|---|
| Phase Function | | |
| b2 | −1.873030E−04 | |
| b4 | 2.314580E−08 | |
| b6 | −7.237740E−12 | |
| b8 | 9.527280E−16 | |
| b10 | −4.796180E−20 | |
| d0 | −4.916420E−03 | |
| d1 | 1.039814E−07 | |
| d2 | 1.521892E−07 | |
| d3 | 3.969140E−11 | |
| d4 | −2.684900E−12 | |
| d5 | | |
| d6 | | |

Suffics s is on the laser side
Suffics e is on the side opposite the laser side

| Non-spherical Coefficient | | |
|---|---|---|
| R | −6.67480E+02 | −2.71371E+04 |
| K | | −6.38436E+11 |
| B4 | | −2.71246E−07 |
| B6 | | 3.29363E−11 |
| B8 | | −3.07836E−15 |
| B10 | | 1.28535E−19 |
| r0 | ∞ | −8.63115E+01 |
| D2s | | 4.03490E−05 |
| D4s | | 3.62154E−09 |
| D6s | | −4.31792E−12 |
| D8s | | 8.63612E−16 |
| D10s | | −5.41252E−20 |
| D2e | | 5.85138E−05 |
| D4e | | −9.23187E−09 |
| D6e | | 2.08091E−13 |
| D8e | | 1.66734E−16 |
| D10e | | −1.66814E−20 |

Since the imaging optical system in this exemplary embodiment is the same as that in the second exemplary embodiment, the focal shifting that occurs in the imaging optical system when the temperature rises is the same as shown in FIG. 6.

Figure 10:
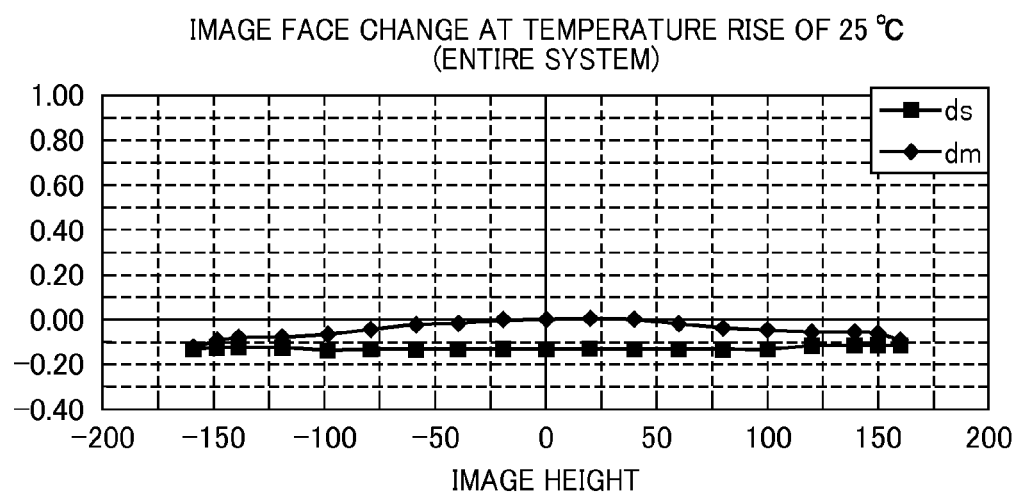
FIG. 10 illustrates a graph showing the focal shifting distance of the optical scanning apparatus of the third exemplary embodiment as the environment changes.

FIG. 10 illustrates a graph showing a plotted focal shift that occurred, at the time of an environmental change (Δt=temperature rise of 25° C.), throughout the entire optical scanning system, which includes the collimating lens 3, the temperature compensation optical device (a refractive optical element) 74, the cylinder lens 72 having power in the sub-scanning direction, the plastic lens 61 and the diffractive optical element 62, on the plastic lens face of which a diffraction grating is formed. According to this graph, it is understood that almost no focal shifting occurred in the main scanning direction and in the sub-scanning direction.

In this exemplary embodiment, a temperature compensation system is defined as a system for which, as shown in FIG. 10, the focal shifting distance that occurs throughout the entire optical scanning system when the environment is changed (Δt=temperature rise of 25° C.) is limited so it does not exceed a distance of 0.5 mm.

dm denotes an image face change distance (a focal shifting distance) in the main scanning direction, and ds denotes an image face change distance (a focal shifting distance) in the sub-scanning distance. M denotes the original direction, and S denotes the sagittal direction.

As described above, the refractive index of the plastic material is reduced when the temperature is raised. For a plastic lens having positive power, as the temperature rises, the focus is shifted in the positive direction (toward the target scanning face). For a plastic lens having negative power, as the temperature rises, the focus is shifted in the negative direction (toward the deflection unit). By utilizing this, the plastic lens (a refractive optical element) 74, which serves as a temperature compensation optical device having negative power in the main scanning direction, compensates for the focal shifting in the positive direction that occurs at the plastic lens 61 and the diffractive optical element 62, on the plastic lens face of which a diffraction grating is formed, that both have positive synthesis power in the main scanning direction.

The power of the plastic lens 61 and the diffractive optical element 62, on the plastic lens face of which a diffraction grating is formed, is changed as the refractive indexes of these lenses 61 and 62 change due to temperature fluctuation. The power of the plastic lens 61 and the diffractive optical element 62 is also changed because of the change in the wavelength of the light source 1 that occurs due to temperature fluctuation. Further, the power of the plastic lens (temperature compensation optical device) 74 is changed as the wavelength of the light source 1 is changed due to temperature fluctuation. A focus change that is caused by the power changes affecting the plastic lens 61 and the diffractive optical element 62 should be compensated for by a focus change that is produced by the power change at the plastic lens 74. Thus, the ratio of the synthesis power in the main scanning direction of the plastic lens 61 and the diffractive optical element 62 relative to the power in the main scanning direction of the plastic lens (the temperature compensation optical device) 74 is set so as to perform such compensation.

As described above, the focal shifting of the imaging optical system in the sub-scanning direction that occurs due to environmental change can be compensated for by the diffractive optical element that is arranged in the imaging optical system and that has a diffraction surface. The focal shifting of the imaging optical system in the main scanning direction can be compensated for by the plastic lens (the temperature compensation optical device) 74 that is located along the optical path extending from the light source 1 to the deflection unit 5 and that has negative power (a concave face) in the main scanning direction.

With such an optical system wherein the imaging optical system is constituted by the plastic lens 61 and the diffractive optical element 62, on the plastic lens face of which a diffraction grating is formed, focal shifting does not occur due to an environmental change. Furthermore, since the plastic lens (a dioptric lens) is employed, an inexpensive optical scanning apparatus can be provided.

Furthermore, the optical scanning apparatus in this example of the exemplary embodiment can satisfy the following expression (2).

$$\left| -\frac{1}{\phi^2} \left( \sum \frac{\frac{dn_i}{d\lambda}}{n_i - 1} \phi_i + \sum \frac{\frac{dn_k}{d\lambda}}{n_k - 1} \phi_k' \right) \times \beta^2 \right| < 0.5 \cdot FNo.^2 \cdot \lambda \cdot 10^{-6} \quad \text{Ex. (2)}$$

In this expression, ϕ denotes a synthesis power, in the main scanning direction, of the optical system (a first optical system) extending from the light source 1 to the deflection unit 5; $\phi_i$ denotes the power of the i-th lens that constitutes the collimating lens 3 for changing divergent light fluxes, emitted by the light source 1, into light fluxes that are almost parallel; $n_i$ denotes the refractive index of the i-th lens of the collimating lens 3; $dn_i/d\lambda$ denotes the refractive index wavelength change rate of the i-th lens of the collimating lens 3; $\phi_k'$ denotes the power, in the main scanning direction, of the k-th lens that constitutes the temperature compensation optical device; $n_k$ denotes the refractive index of the k-th lens that constitutes the temperature compensation optical device (a refractive optical element); $dn_k/d\lambda$ denotes the refractive index wavelength change rate for the k-th lens that constitutes the temperature compensation optical device (a refractive optical element); $\beta$ denotes the imaging magnification of the optical scanning apparatus in the main scanning direction; and FNo. denotes the emission F number of the imaging optical system in the main scanning direction.

In the example of the third exemplary embodiment, since $\phi=0.02460$, $\phi_1=0.02906$, $n_1=1.52972$, $dn_1/d\lambda=-1.20E-4$, $\phi_1'=0.00688$, $\beta=5.25$, and FNo.$=42.9$, (left side)$=0.204$ and (right side)$=0.372$, the expression (2) is satisfied.

The left side of expression (2) represents a quantity proportional to the chromatic aberration that is generated in the optical system (the first optical system) extending from the light source 1 to the deflection unit 5. The first term on the left side represents a chromatic aberration generated by the collimating lens 3, and the second term represents a chromatic aberration generated on the temperature compensation optical device (a plastic lens having negative power in the main scanning direction) 74. The right side of expression (2) represents a quantity proportional to the depth of focus of the imaging optical system. Compared with the diffractive optical element, a chromatic aberration seldom occurs in a plastic lens having negative power (a concave face) in the main scanning direction. Thus, a chromatic aberration occurring at the collimating lens 3 need be reduced, so that throughout the entire scanning optical system, chromatic aberrations can be suppressed.

The basic idea for the introduction of expression (2) is the same as that for expression (1), except for the replacement of the term in expression (1), for the diffractive optical element, with the term for a plastic lens (a refractive optical element) having negative power (a concave face) in the main scanning direction.

In the first exemplary embodiment, the collimating lens 3 is constituted by a single glass lens; however, exemplary embodiments are not limited to a single lens nor to one made of glass. The collimating lens can include multiple lenses and be made of other optical material(s) as known by one of ordinary skill in the relevant art. Since the collimating lens 3 can be constituted by a plurality of lenses, "i-th lens" is employed in the above explanation. That is, $i \geq 1$ need be established, and i=2, 3, 4, . . . is available.

Therefore, when a plastic lens having negative power (a concave face) in the main scanning direction is selected as a temperature compensation optical device to compensate for the focal shifting in the main scanning direction that occurs at the scanning lenses 61 and 62, at least one exemplary embodiment can have the collimating lens 3 with an average Abbe number that is large and made of a lens material selected from materials with properties within the range $50<\nu<85$. Incidentally, in this example of the exemplary embodiment, S-BSL7, produced by OHARA Co., Ltd. ($\nu=64.14$), is employed as the collimating lens 3.

Figure 11:
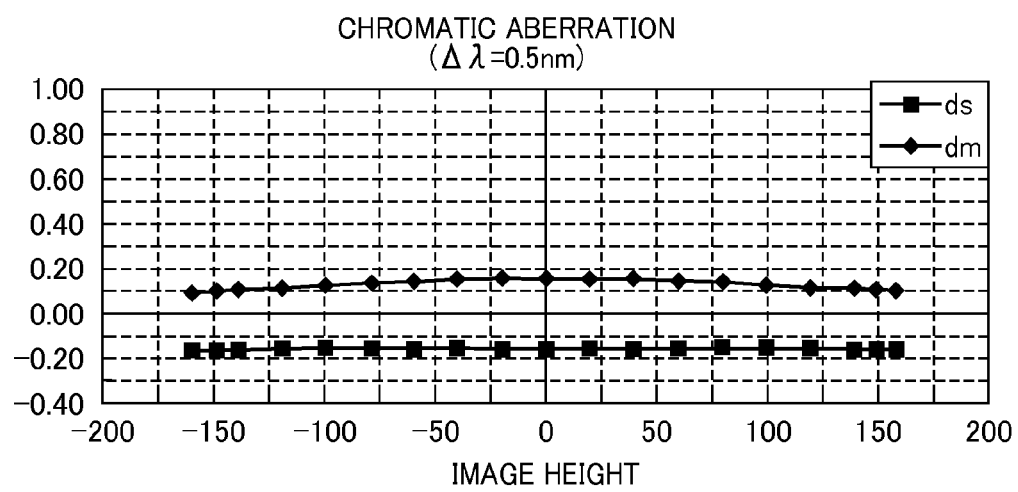
FIG. 11 illustrates a graph showing an axial chromatic aberration for the optical scanning apparatus according to the third exemplary embodiment.

FIG. 11 illustrates a graph showing the axial chromatic aberration, plotted for each image height, that is obtained upon the application of a wavelength difference of 0.5 nm. Since an appropriate material for the collimating lens, appropriate power for the diffractive optical element and an appropriate imaging magnification for the optical scanning apparatus are designated, temperature compensation can be provided and the chromatic aberration can be managed and limited to a level wherein it presents practically no problem (within the depth of focus).

Figure 12:
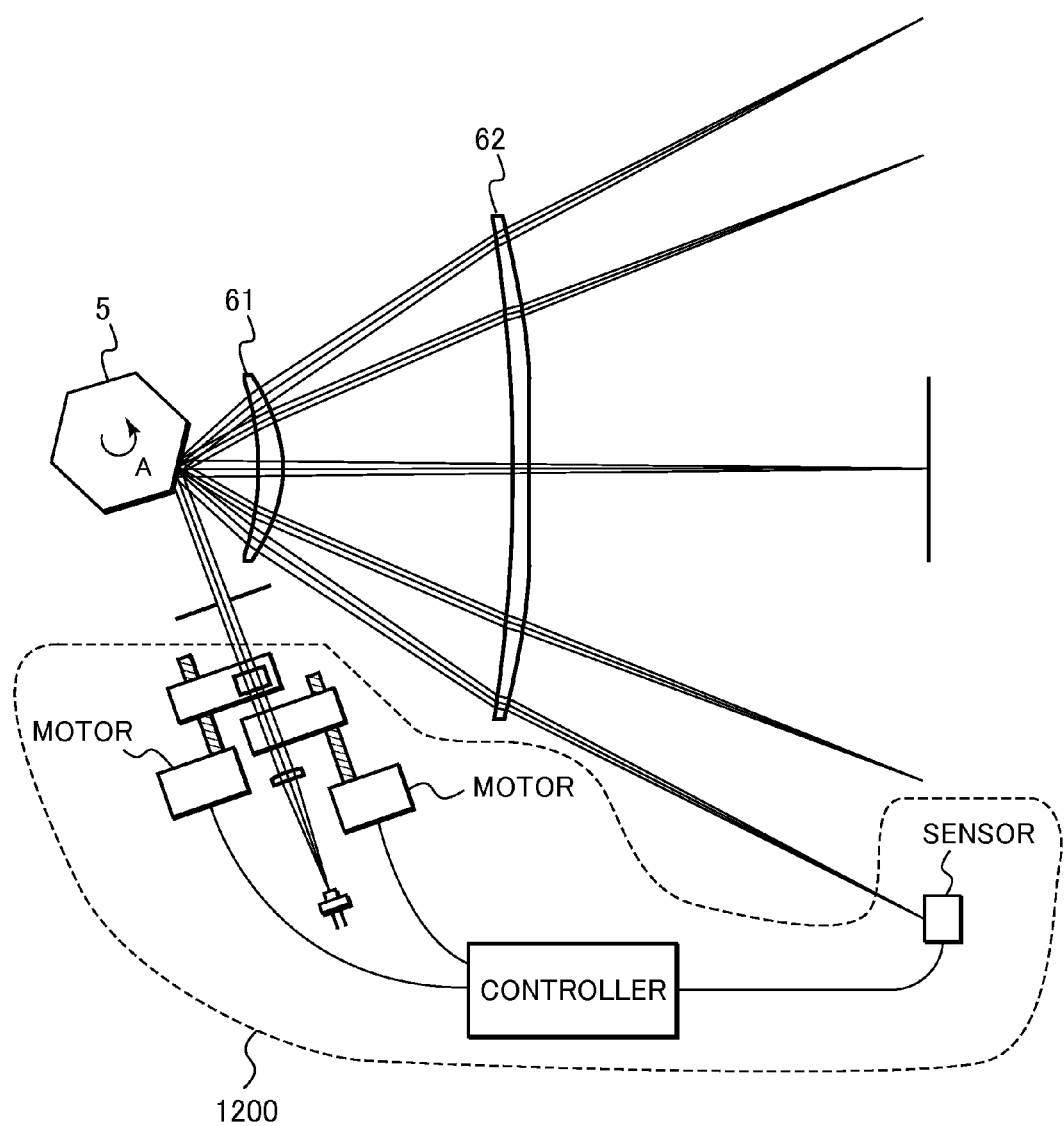
FIG. 12 illustrates a specific diagram showing an auto focusing mechanism according to the third exemplary embodiment.

Furthermore, according to this exemplary embodiment, the focal adjustment in the main scanning direction can be performed by moving, in the light axial direction, the temperature compensation optical device (a plastic lens having negative power in the main scanning direction) 74. And the focal adjustment in the sub-scanning direction can be performed by moving, in the light axial direction, the cylinder lens 72 having power in the sub-scanning direction. Generally, moving the temperature compensation optical device 74 along the light axis and moving the cylinder lens 72 along the light axis are performed in order to provide adjustments for the initial focusing shift that occurs due to manufacturing errors or for an attachment error for a single item in an imaging optical system. In addition to the initial focal shifting adjustment, an auto focusing mechanism 1200 shown in FIG. 12 can be provided for periodically adjusting the focus.

In this example of at least one exemplary embodiment, a semiconductor laser having one light emission portion that can emit a single light flux has been employed. However, a light source, such as a surface emitting laser, having three or more light emission portions can also be employed in at least one exemplary embodiment.

In the third exemplary embodiment, the imaging optical system has been constituted by the two plastic lenses 61 and 62. However, the imaging optical system can be constituted by a single plastic lens (a refractive optical element) for which power both in the main scanning direction and in the sub-scanning direction is positive. Further, so long as at least one plastic lens is included in the imaging optical system, one or more glass fθ lenses can also be included to constitute this system.

The focal shifting of a glass fθ lens due to an environmental temperature change is smaller than is that of a plastic lens. Thus, when at least one exemplary embodiment is applied to an imaging optical system that includes one or more glass fθ lenses, the focal shifting of a plastic fθ lens, due to an environmental temperature change, can be taken into account.

Fourth Exemplary Embodiment

Figure 13:
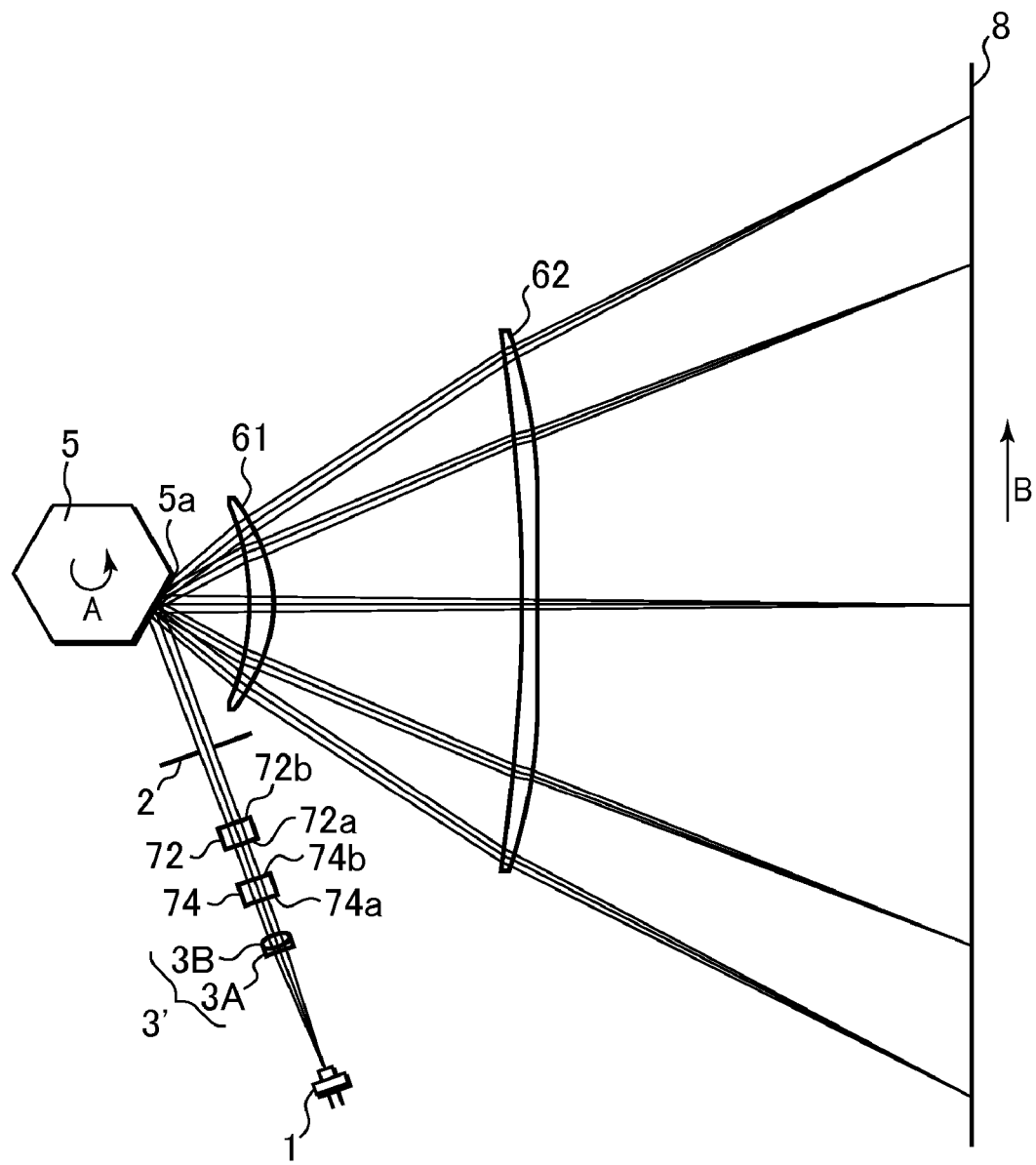
FIG. 13 illustrates a cross-sectional view of an optical scanning apparatus according to a fourth exemplary embodiment.

FIG. 13 illustrates a main-scanning cross-sectional view of an optical scanning apparatus according to a fourth exemplary embodiment.

One difference between the fourth exemplary embodiment and the third exemplary embodiment is that in the fourth exemplary embodiment laminated achromatic lenses are employed as a collimating lens set 3'. Since the other arrangements are the same as those in the third exemplary embodiment, no explanation for them will be given. Note, however, that a gallium nitride bluish violet semiconductor laser ($d\lambda/dt=0.04$ nm/° C.), as used in the first to the third exemplary embodiment, is employed as a light source 1.

An optical arrangement and a face shape for this example of this exemplary embodiment are shown in Table 4.

TABLE 4

Design Data

Wavelength, Refractive Index

| | | |
|---|---|---|
| Wavelength Employed | λ(nm) | 405 |

Lens Material
Collimating Lens 3A (S-TIH11 by OHARA Co., Ltd.)

| | | |
|---|---|---|
| Refractive Index | n | 1.84517 |
| Refractive Index Wavelength Change Rate | dn/dλ | −6.40.E−04 |
| Refractive Index Temperature Change Rate | dn/dt | 5.30.E−06 |

Collimating Lens 3B (S-BHA28 by OHARA Co., Ltd.)

| | | |
|---|---|---|
| Refractive Index | n | 1.75757 |
| Refractive Index Wavelength Change Rate | dn/dλ | −3.60.E−04 |
| Refractive Index Temperature Change Rate | dn/dt | 7.40.E−06 |

Sub-Scanning Cylinder Lens (S-LAH60 By OHARA Co., Ltd.)

| | | |
|---|---|---|
| Refractive Index | n | 1.87362 |
| Refractive Index Wavelength Change Rate | dn/dλ | −4.10.E−04 |
| Refractive Index Temperature Change Rate | dn/dt | 1.01.E−05 |

Temperature compensation Optical Device, Toric Lens, Composite Optical Device

| | | |
|---|---|---|
| Refractive Index | n | 1.54662 |
| Refractive Index Wavelength Change Rate | dn/dλ | −1.67182.E−04 |
| Refractive Index Temperature Change Rate | dn/dt | −7.98793.E−05 |

Arrangement

| | | |
|---|---|---|
| Laser Incident Angle (Degrees) | | −70 |
| Maximum Light Emission Angle (Degrees) | | ±42 |
| Polygon Center Coordinates (mm) | Main Scanning | −15.10997 |
| | Sub-scanning | 8.6181 |
| Polygon Plane Count | | 6 |
| Polygon, Outside Diameter (mm) | | φ40 |
| Diaphragm (Elliptic) Diameter (mm) | Main Scanning | 4.96 |
| | Sub-scanning | 1.12 |
| Distance Between Light Emission Point And Collimating Lens (Including LD Cover Glass) | | 41.77 |
| Collimating Lens 3A Center Thickness | | 1.75 |
| Collimating Lens 3B Center Thickness | | 3.5 |
| Distance Between Collimating Lens 3B And Temperature Compensation Optical Device | | 12 |
| Temperature Compensation Optical Device Center Thickness | | 7 |
| Distance Between Temperature Compensation Optical Device And Sub-Scanning Cylinder Lens | | 11 |
| Sub-Scanning Cylinder Lens Center Thickness | | 7 |
| Distance Between Sub-Scanning Cylinder Lens And Diaphragm | | 26 |
| Distance Between Diaphragm And Deflection Reference Point | | 50 |
| Distance Between Deflection Reference Point And Toric Lens 61 | | 30 |
| Toric Lens 61 Center Thickness | | 8 |
| Distance Between Toric Lens 61 And Toric Lens 62 | | 78 |
| Toric Lens 62 Center Thickness | | 5.5 |
| Distance Between Toric Lens 62 And Target Scanning Face | | 135.5 |
| Distance Between Deflection Reference Point And Target Scanning Face | | 257 |
| Effective Scanning Width | | 312 |

TABLE 4-continued

Design Data

Face Shape

| | First Face | Second Face |
|---|---|---|

Collimating Lens 3A

| | | |
|---|---|---|
| R | ∞ | 17.76949 |

Collimating Lens 3B

| | | |
|---|---|---|
| R | 17.76949 | −22.94312 |

Temperature Compensation Optical Device 74
Curvature Radius

| | | |
|---|---|---|
| R | −80.004 | ∞ |
| r | −80.004 | ∞ |

Sub-Scanning Cylinder Lens 72
Curvature Radius

| | | |
|---|---|---|
| R | ∞ | ∞ |
| r | 69.0 | ∞ |

Toric Lens 61 Nonspherical Coefficient

| | First Face | Second Face |
|---|---|---|
| R | −6.66315E+01 | −4.32247E+01 |
| K | −1.20676E+00 | −1.17827E+00 |
| B4 | 2.21574E−06 | 5.39830E−07 |
| B6 | −9.23382E−11 | 7.07201E−10 |
| B8 | −6.16766E−14 | −2.54874E−13 |
| B10 | 1.62177E−16 | 2.57739E−16 |
| r0 | ∞ | ∞ |
| D2s | | |
| D4s | | |
| D6s | | |
| D2e | | |
| D4e | | |
| D6e | | |

Toric Lens 62

| | First Face | Second Face |
|---|---|---|

Phase Function

| | |
|---|---|
| b2 | −1.873030E−04 |
| b4 | 2.314580E−08 |
| b6 | −7.237740E−12 |
| b8 | 9.527280E−16 |
| b10 | −4.796180E−20 |
| d0 | −4.916420E−03 |
| d1 | 1.039814E−07 |
| d2 | 1.521892E−07 |
| d3 | 3.969140E−11 |
| d4 | −2.684900E−12 |
| d5 | |
| d6 | |

Suffics s is on the laser side
Suffics e is on the side opposite the laser side

Non-spherical Coefficient

| | First Face | Second Face |
|---|---|---|
| R | −6.67480E+02 | −2.71371E+04 |
| K | | −6.38436E+11 |
| B4 | | −2.71246E−07 |
| B6 | | 3.29363E−11 |
| B8 | | −3.07836E−15 |
| B10 | | 1.28535E−19 |
| r0 | ∞ | −8.63115E+01 |
| D2s | | 4.03490E−05 |
| D4s | | 3.62154E−08 |
| D6s | | −4.31792E−12 |
| D8s | | 8.63612E−16 |
| D10s | | −5.41252E−20 |
| D2e | | 5.85138E−05 |
| D4e | | −9.23187E−09 |
| D6e | | 2.08091E−13 |

TABLE 4-continued

| Design Data | |
| --- | --- |
| D8e | 1.66734E−16 |
| D10e | −1.66814E−20 |

Since the imaging optical system of this exemplary embodiment is the same as that of the second and the third exemplary embodiments, the focal shifting that occurs in the imaging optical system when the temperature rises is the same as that shown in FIG. 6.

Figure 14:
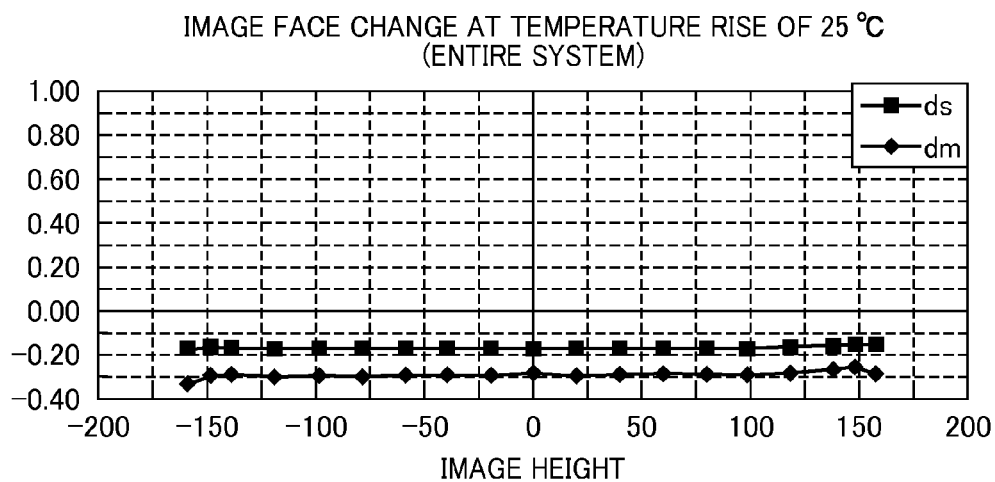
FIG. 14 illustrates a graph showing the focal shifting distance of the optical scanning apparatus of the fourth exemplary embodiment as the environment changes.

FIG. 14 illustrates a graph showing a plotted focal shift that occurred, at the time of an environment change ($\Delta t$=temperature rise of 25° C.), throughout the entire optical scanning system, which includes laminated collimating lenses 3A and 3B, a temperature compensation optical device 74, a cylinder lens 72 having power in the sub-scanning direction and plastic lenses 61 and 62. According to this graph, it is understood that the focal shifting in the main scanning direction is reduced compared with the focal shifting that occurs in the imaging optical system (FIG. 6).

Furthermore, the optical scanning apparatus in this exemplary embodiment, as in the third exemplary embodiment, can satisfy expression (2).

In the example of the fourth exemplary embodiment, since $\phi$=0.02402, $\phi_1$=−0.04739, $n_1$=1.84217, $dn_1/d\lambda$=−6.40E−4, $\phi_2$=0.07285, $n_2$=1.75757, $dn_2/d\lambda$=−3.60E−4, $\phi_1'$=−0.00683, $\beta$=5.12, and FNo.=42.9, (left side)=0.158 and (right side)=0.372, expression (2) is satisfied.

Since the laminated achromatic lenses are employed as collimating lenses, the chromatic aberration can be further compensated for.

Incidentally, in this example of at least one exemplary embodiment, S-TIH11, produced by OHARA Co., Ltd. ($\nu$=25.68), is employed as the collimating lens 3A, while S-BAH28, produced by OHARA Co., Ltd. ($\nu$=37.95), is employed as the collimating lens 3B, and the chromatic aberration is corrected in a wavelength range near 405 nm.

Figure 15:
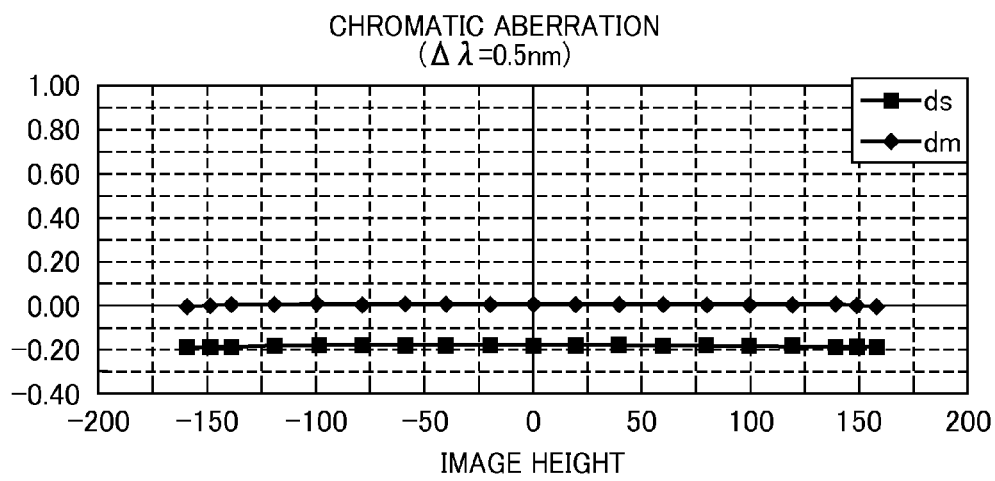
FIG. 15 illustrates a graph showing an axial chromatic aberration for the optical scanning apparatus according to the fourth exemplary embodiment.
Figure 16:
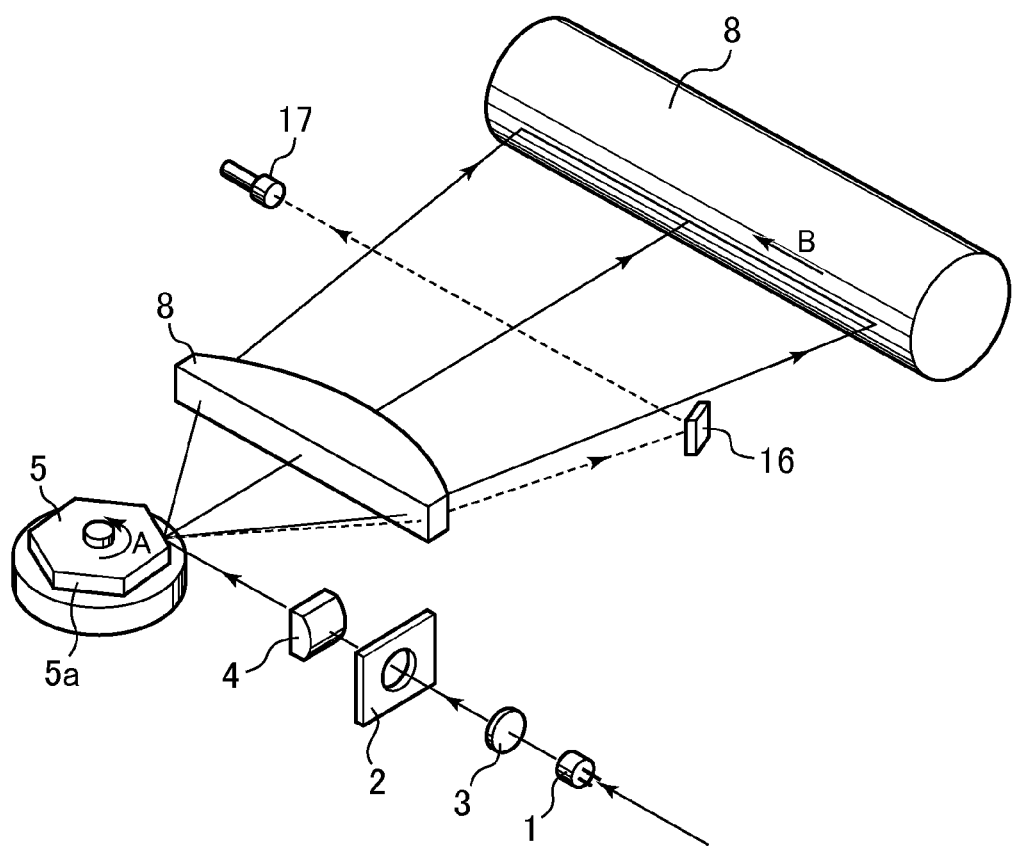
FIG. 16 illustrates a perspective view of a conventional optical scanning apparatus.
Figure 17:
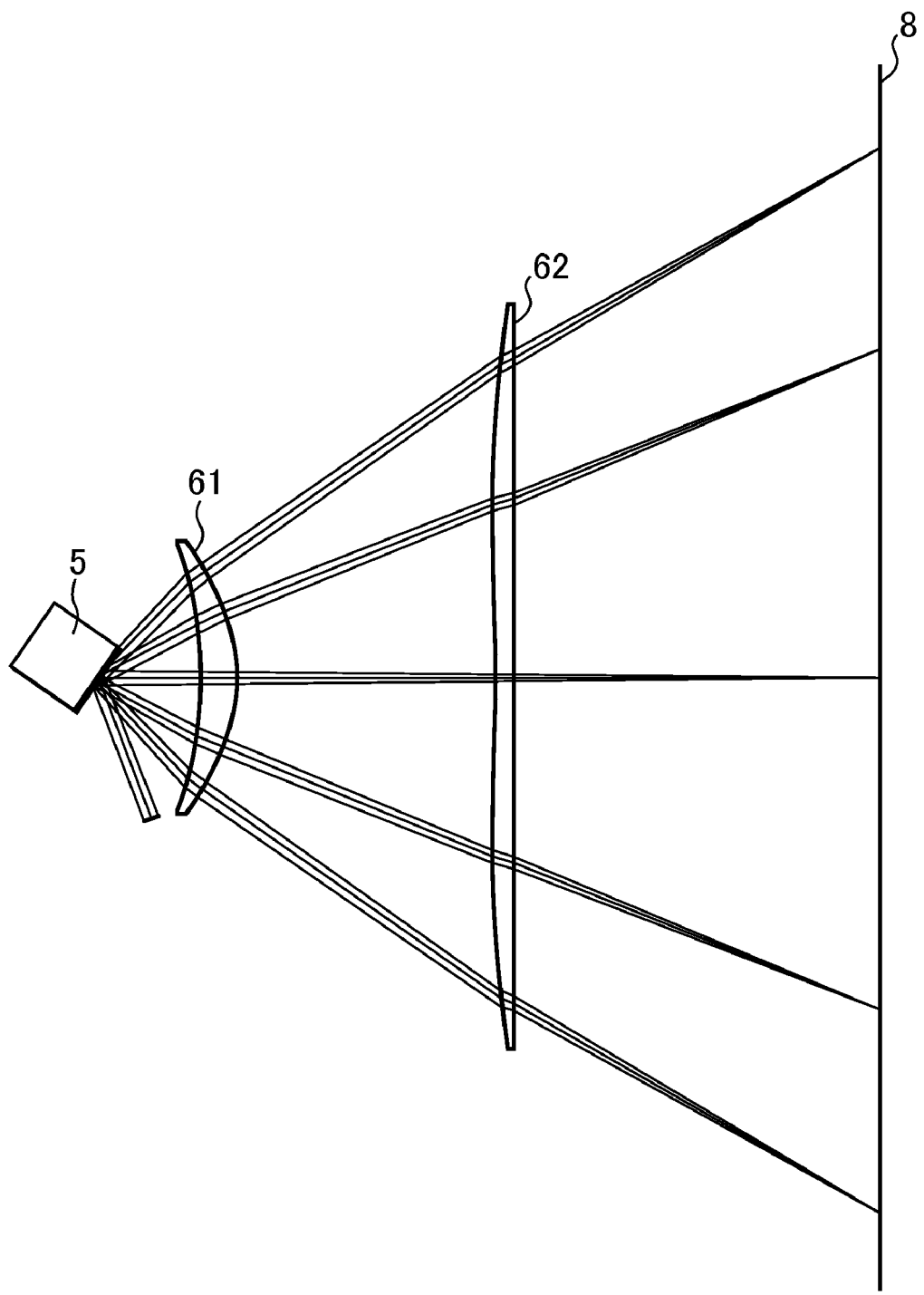
FIG. 17 illustrates a cross-sectional view of a conventional optical scanning apparatus employing a bluish violet semiconductor laser.
Figure 18:
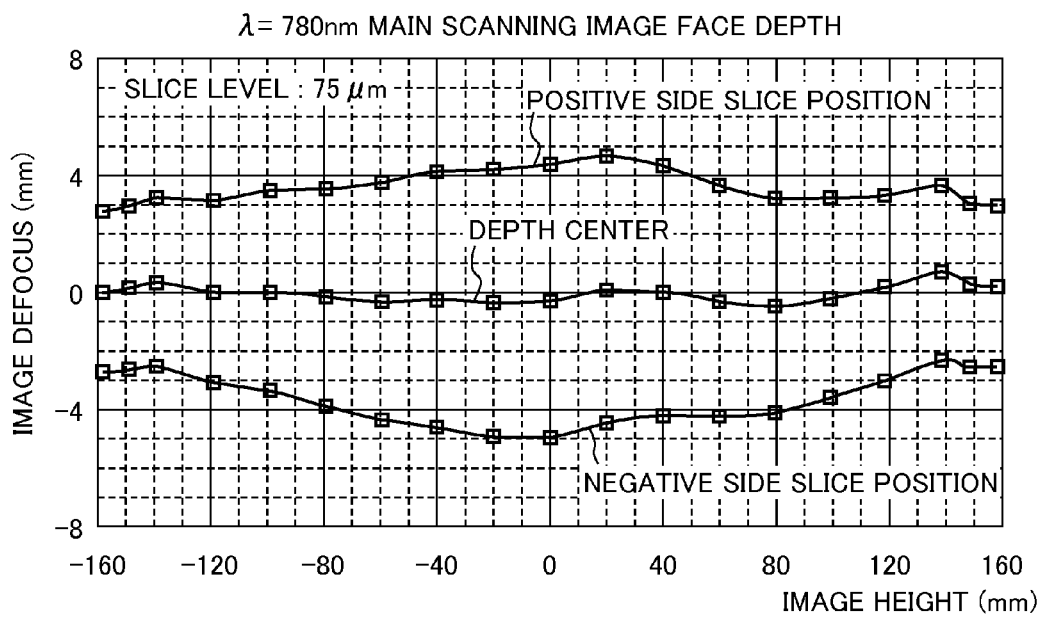
FIG. 18 illustrates a graph showing the depth of focus in the main scanning direction when an infrared laser is employed.
Figure 19:
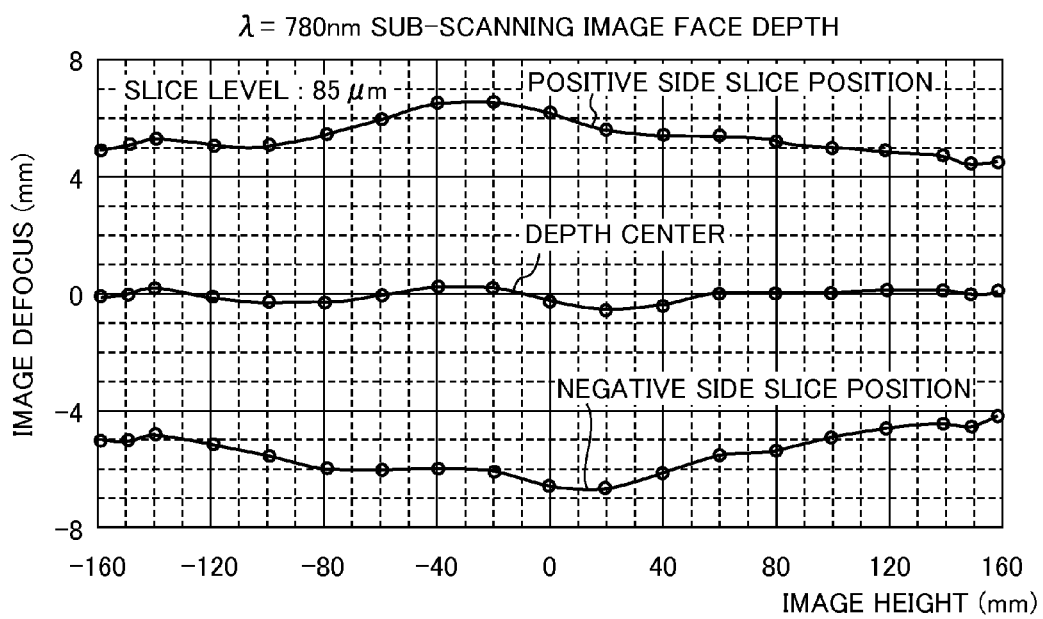
FIG. 19 illustrates a graph showing the depth of focus in the sub-scanning direction when an infrared laser is employed.
Figure 20:
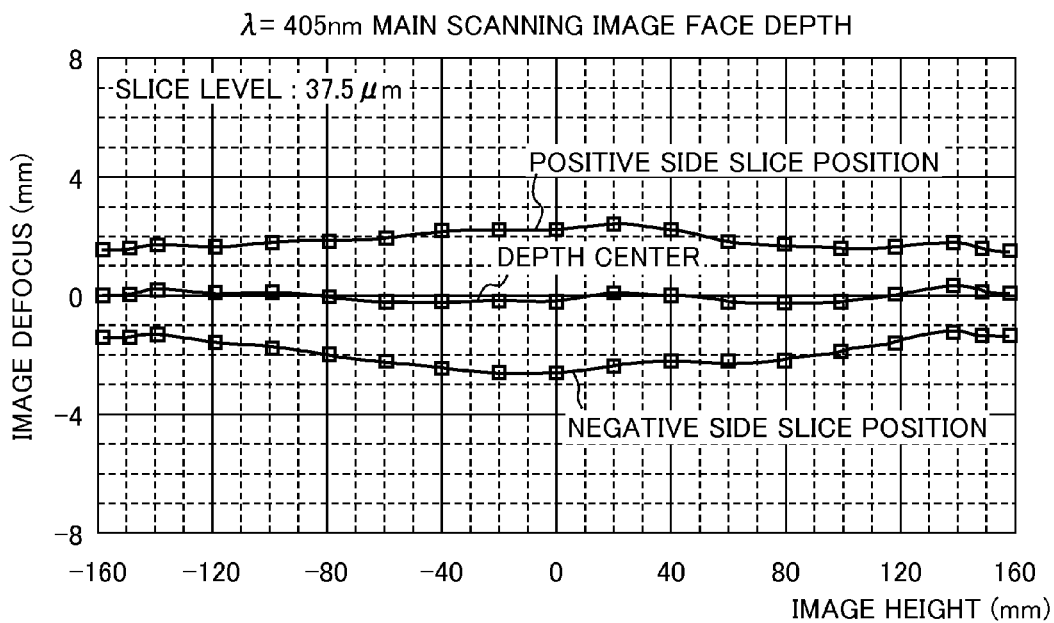
FIG. 20 illustrates a graph showing the depth of focus in the main scanning direction when a bluish violet laser is employed.
Figure 21:
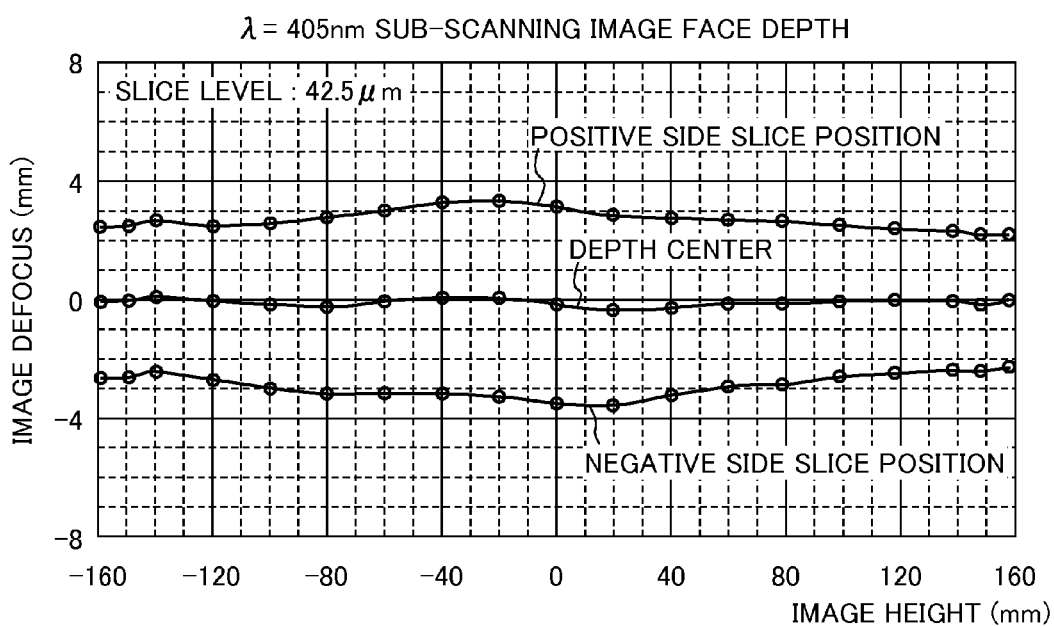
FIG. 21 illustrates a graph showing the depth of focus in the sub-scanning direction when a bluish violet laser is employed.
Figure 22:
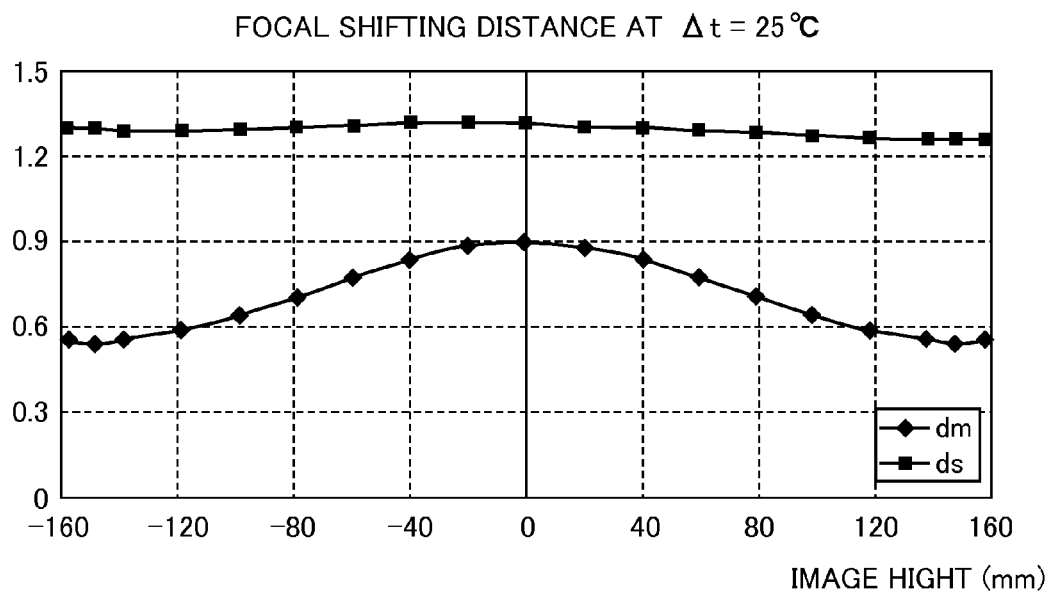
FIG. 22 illustrates a graph showing a focal shifting distance of an imaging optical system formed of a refracting lens as the environment changes.

FIG. 15 is a graph, plotted for each image height, showing an axial chromatic aberration that occurred upon the application of a wavelength difference of 0.5 nm. Since an appropriate material for the collimating lens, an appropriate power for the temperature compensation optical device and an appropriate imaging magnification for the optical scanning apparatus are designated, and since laminated achromatic lenses are employed as collimating lenses, the chromatic aberration in the main scanning direction can be considerably reduced, compared with that in FIG. 11.

Fifth Exemplary Embodiment

Figure 23:
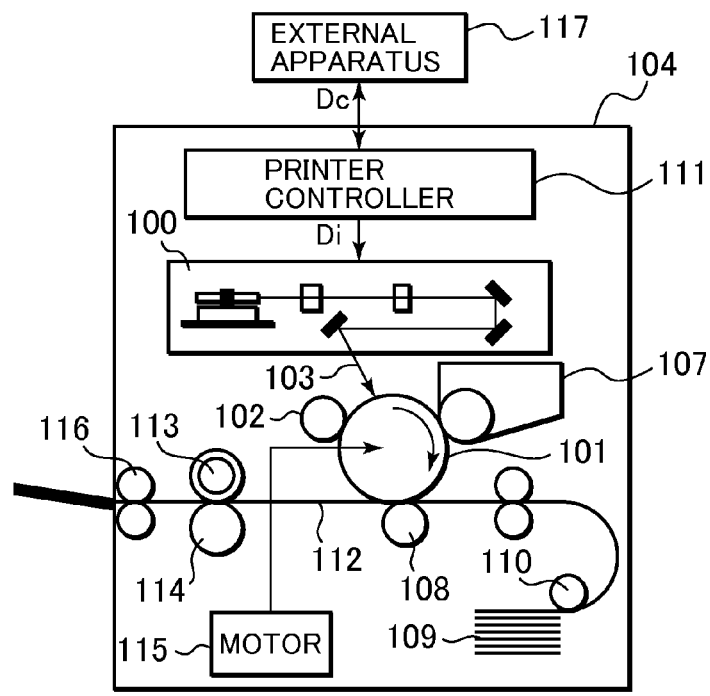
FIG. 23 illustrates a cross-sectional view of the essential portion of an image forming apparatus.

FIG. 23 illustrates a cross-sectional view of the essential portion, taken along the sub-scanning direction, of an image forming apparatus that employs the optical scanning apparatus of at least one exemplary embodiment. In FIG. 23, code data Dc are transmitted by an external apparatus 117, such as a personal computer, to an image forming apparatus 104. The code data Dc are converted, by a printing controller 111, into image data (dot data) Di, which are then transmitted to an optical scanning unit 100 having the same configuration as that described in the first to the fourth exemplary embodiments. A light beam 103, modulated in accordance with the image data Di, can be emitted by the optical scanning unit 100 and scans the photosensitive face of a photosensitive drum 101 in the main scanning direction.

The photosensitive drum 101, which is an electrostatic latent image bearing member (a photosensitive member), is rotated clockwise by a motor 115. As the photosensitive drum 101 is rotated, the photosensitive phase is moved, relative to the light beam 103, in the sub-scanning direction perpendicular to the main scanning direction. A charging roller 102 that uniformly changes the surface of the photosensitive drum 101 is located above the photosensitive drum 101 so as to abut upon the surface of the photosensitive drum 101. With this arrangement, the light beam 103 emitted by the optical scanning unit 100 can be used to scan the surface of the photosensitive drum 101 that is charged by the charging roller 102.

As previously described, the light beam 103 is modulated based on the image data Di, and through irradiation performed using the light beam 103, an electrostatic latent image is formed on the surface of the photosensitive drum 101. The electrostatic latent image is then developed, as a toner image, by a developing device 107, which is located further downstream in the rotational direction of the photosensitive drum 101 than the irradiation position of the light beam 103 and is arranged so as to abut upon the photosensitive drum 101.

The toner image developed by the developing device 107 is transferred to a sheet 112, a transfer material, by a transferring roller 108 that is located below and opposite the photosensitive drum 101. Multiple sheets 112 are stacked in a sheet cassette 109 upstream of (to the right of, in FIG. 23) the photosensitive drum 101, and a sheet feeding roller 110, located at the end of the sheet cassette 109, extracts individual sheets 112 from the sheet cassette 109 and feeds them to a conveying path. The sheets 112, however, can also be fed manually.

A sheet 112 bearing an unfixed toner image is conveyed to a fixing device located downstream of (to the left of, in FIG. 23) the photosensitive drum 101. The fixing device includes a fixing roller 113, which has an internally mounted fixing heater (not shown), and a pressure roller 114, which is arranged so as to be pressed against the fixing roller 113. The sheet 112 conveyed from the transferring section is heated under pressure by a pressing section of the fixing roller 113 and the pressure roller 114 and the unfixed image is fixed to the sheet 112. Thereafter, discharge rollers 116, located following the fixing roller 113, discharge the image bearing sheet 112 to the outside of the image forming apparatus.

Although not shown in FIG. 23, the printing controller 111 not performs the above described data conversion, but also controls individual sections of the image forming apparatus, such as a motor 115 and a polygon motor, in the optical scanning unit, that will be described later.

Figure 24:
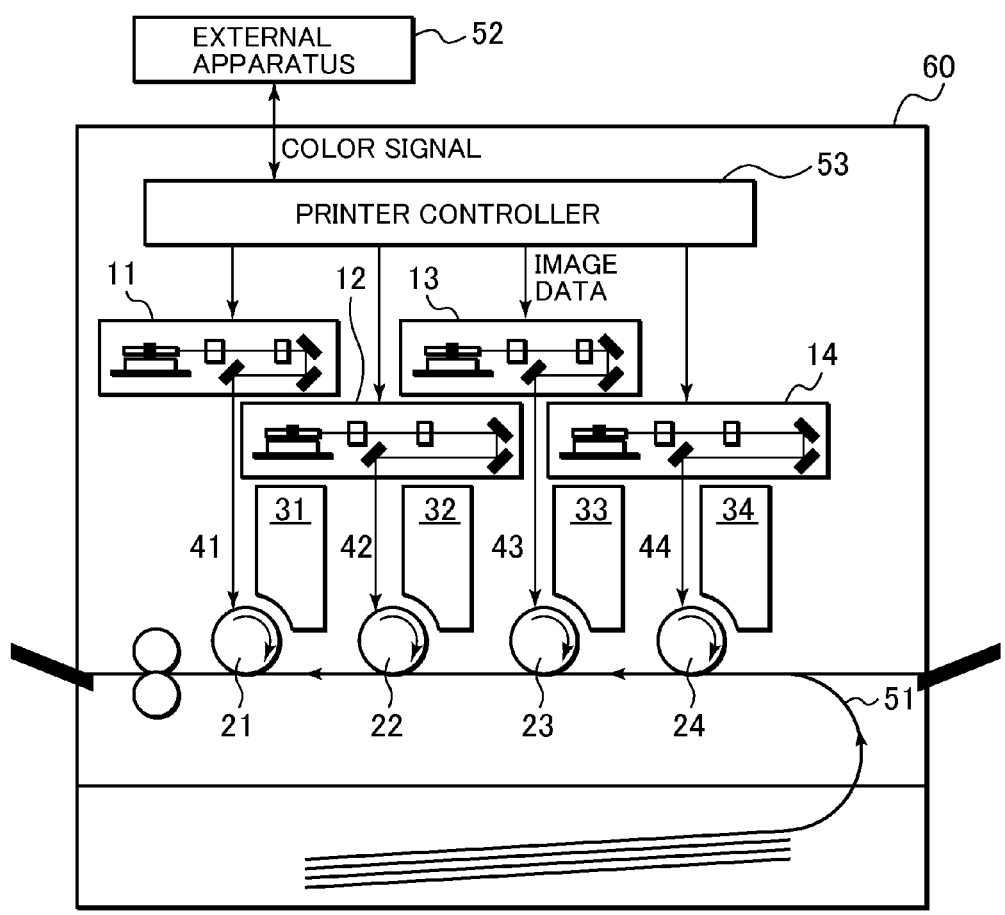
FIG. 24 illustrates a cross-sectional view of the essential portion of a color image forming apparatus.

FIG. 24 illustrates a schematic diagram showing the essential portion of a color image forming apparatus that employs the optical scanning apparatus of at least one exemplary embodiment. According to this exemplary embodiment, a color image forming apparatus of a tandem type is employed wherein four optical scanning apparatuses are arranged and record image data, in parallel, on the surfaces of respective photosensitive drums, which are image bearing members. In FIG. 24, a color image forming apparatus 60 includes: optical scanning apparatuses 11, 12, 13 and 14, configured as explained in one of the first to the fourth exemplary embodiments; photosensitive drums 21, 22, 23 and 24, which are image bearing members; developing devices 31, 32, 33 and 34; and a conveying belt 51.

In FIG. 24, color signals for R (red), G (green) and B (blue) are transmitted by an external apparatus 52, such as a personal computer, to the color image forming apparatus 60. A printer controller 53 converts these color signals into image data (dot data) for C (cyan), M (magenta), Y (yellow) and B (black), which are then transmitted to the optical scanning apparatuses 11, 12, 13 and 14. Light beams 41, 42, 43 and 44, modulated in accordance with these image data, are emitted by the optical scanning apparatuses 11 to 14 and are used to scan the photosensitive faces of the photosensitive drums 21 to 24 in the main scanning direction.

According to the color image forming apparatus 60 of this exemplary embodiment, the four optical scanning apparatuses 11 to 14 are arranged in consonance with the individual colors for C (cyan), M (magenta), Y (yellow) and B (black), and record image signals (image data) in parallel on the faces of the photosensitive drums 21 to 24, so that a color image can be printed at high speed.

As described above, in the color image forming apparatus 60 of this exemplary embodiment, the four optical scanning apparatuses 11 to 14 emit light beams based on image data to form individually colored latent images on the surfaces of corresponding photosensitive drums 21 to 24. Thereafter, these images are transferred to and superimposed on a recording medium to form a single full color image.

A color image reading apparatus including a CCD sensor, for example, can be employed as the external apparatus 52. In this case, the color image reading apparatus and the color image forming apparatus 60 constitute a color digital copier.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An optical scanning apparatus comprising:
   a light source;
   a deflection unit configured to deflect a light flux emitted by the light source;
   a first optical system configured to condense, at the deflection unit, a divergent light flux emitted by the light source;
   a second optical system configured to focus, on a target scanning face, the light flux deflected by the deflection unit,
   wherein the wavelength of the light flux emitted by the light source is 450 nm or shorter,
   wherein a first refractive optical element made of plastic is arranged in the second optical system, and a second refractive optical element is arranged in the first optical system,
   wherein power for the first refractive optical element in a main scanning direction and power for the second refractive optical element in the main scanning direction have the different sign, and
   wherein a ratio of the power of the first refractive optical element in a main scanning direction to the power of the second refractive optical element in the main scanning direction is set so that a focus change, caused by a power change at the first refractive optical element, is compensated for by using a focus change that is produced by a power change at the second refractive optical element.

2. An optical scanning apparatus according to claim 1, wherein a temperature characteristic of the wavelength of the light flux emitted by the light source is 0.03 (nm/°C.)<dλ/dt<0.10 (nm/°C.).

3. An optical scanning apparatus according to claim 1, wherein the light source has a plurality of light emission points.

4. An optical scanning apparatus according to claim 3, wherein the light source is a multi-beam light source obtained by combining multiple monolithic multi-beam light sources having a plurality of light emission points.

5. An optical scanning apparatus according to claim 1, wherein the second refractive optical element is made of plastic.

6. An image forming apparatus comprising:
   an optical scanning apparatus according to claim 1;
   a photosensitive member arranged on a target scanning face;
   a developing device, configured to develop, as a toner image, an electrostatic latent image that is formed on the photosensitive member by a light flux emitted by the optical scanning apparatus;
   a transferring device, configured to transfer the toner image to a target material to which the toner image is to be transferred; and
   a fixing device, configured to fix the toner image to the target material.

7. An image forming apparatus comprising:
   an optical scanning apparatus according to claim 1; and
   a printer controller, configured to convert code data received from an external apparatus into image signals and for transmitting the image signals to the optical scanning apparatus.

8. A color image forming apparatus comprising:
   a plurality of optical scanning apparatuses, according to claim 1; and
   a plurality of image bearing members respectively arranged at target scanning face locations configured to form, by the optical scanning apparatuses, of images of different colors.

9. A color image forming apparatus according to claim 8, further comprising:
   a printer controller, configured to convert color signals received from an external apparatus into image data of different colors and configured to transmit the image data to the optical scanning apparatuses.

10. An optical scanning apparatus comprising:
    a light source;
    a deflection unit, configured to deflect a light flux emitted by the light source;
    a first optical system, which includes a third refractive optical element having at least one lens configured to condense, toward the deflection unit, a divergent light flux emitted by the light source; and
    a second optical system, which includes a first refractive optical element made of plastic configured to focus, on a target scanning face, the light flux deflected by the deflection unit,
    wherein a wavelength of the light flux emitted by the light source is 450 nm or shorter,
    wherein a second refractive optical element made of plastic is arranged in the first optical system,
    wherein power for the first refractive optical element in a main scanning direction and power for the second refractive optical element in the main scanning direction have the different sign,
    wherein, when synthesis power in the main scanning direction for the first optical system is denoted by $\Phi$, and the power in the main scanning direction for an i-th lens that constitutes the third refractive optical element is denoted by $\phi_i$, the refractive index for the i-th lens that constitutes the third refractive optical element is denoted by $n_i$, the change rate for the refractive index relative to the wavelength of the i-th lens that constitutes the third refractive optical element is denoted by $dn_i/d\lambda$, the power in the main scanning direction for a k-th lens that constitutes the second refractive optical element in the main scanning direction is denoted by $\phi_k$, the change rate for the refractive index relative to the wavelength of the k-th lens that constitutes the second refractive optical element is denoted by $dn_k/d\lambda$, an imaging magnification for the optical scanning apparatus in the main scanning direction is denoted by $\beta$ and an emission F number for the second optical system in the main scanning direction is denoted by FNo. satisfies, $$\left| -\frac{1}{\phi^2} \left( \sum \frac{dn_i/d\lambda}{n_i - 1} \phi_i + \sum \frac{dn_k/d\lambda}{n_k - 1} \phi'_k \right) \times \beta^2 \right| < 0.5 \cdot FNo.^2 \cdot \lambda \cdot 10^{-6}.$$

11. An optical scanning apparatus according to claim 10, wherein an average Abbe number $\nu$ of the third refractive optical element lies in the range of $50<\nu<85$.

12. An optical scanning apparatus according to claim 10, wherein the third refractive optical element is a collimating lens that changes scattering light fluxes emitted by the light source into substantially parallel light fluxes.

13. An optical scanning apparatus according to claim 12, wherein the collimating lens is achromatic lenses made of lens materials having different Abbe numbers $\nu$.

14. An image forming apparatus comprising:
an optical scanning apparatus according to claim 10;
a photosensitive member arranged on a target scanning face;
a developing device, configured to develop, as a toner image, an electrostatic latent image that is formed on the photosensitive member by a light flux emitted by the optical scanning apparatus;
a transferring device, configured to transfer the toner image to a target material to which the toner image is to be transferred; and
a fixing device, configured to fix the toner image to the target material.

15. An image forming apparatus comprising:
an optical scanning apparatus according to claim 10; and
a printer controller, configured to convert code data received from an external apparatus into image signals and for transmitting the image signals to the optical scanning apparatus.

16. A color image forming apparatus comprising:
a plurality of optical scanning apparatuses, according to claim 10; and
a plurality of image bearing members respectively arranged at target scanning face locations configured to form, by the optical scanning apparatuses, of images of different colors.

17. A color image forming apparatus according to claim 16, further comprising:
a printer controller, configured to convert color signals received from an external apparatus into image data of different colors and configured to transmit the image data to the optical scanning apparatuses.

18. An optical scanning apparatus according to claim 10, wherein the third refractive optical element is a collimating lens that changes scattering light fluxes emitted by the light source into a converged light flux.

19. An optical scanning apparatus comprising:
a light source;
a deflection unit configured to deflect a light flux emitted by the light source;
a first optical system configured to condense, at the deflection unit, a divergent light flux emitted by the light source;
a second optical system configured to focus, on a target scanning face, the light flux deflected by the deflection unit,
wherein the wavelength of the light flux emitted by the light source is 450 nm or shorter,
wherein a first refractive optical element made of plastic is arranged in the second optical system, and a second refractive optical element is arranged in the first optical system, and
wherein power for the first refractive optical element in a main scanning direction and power for the second refractive optical element in the main scanning direction have the different sign, and
wherein a ratio of the power of the first refractive optical element in a main scanning direction to the power of the second refractive optical element in the main scanning direction is set so that a focus change caused by a power change at the first refractive optical element by a refractive index change of the first refractive optical element due to a temperature fluctuation and a power change at the first refractive optical element by a wavelength change of the light flux emitted by the light source due to a temperature fluctuation is compensated for by using a focus change that is produced by a power change at the second refractive optical element by a refractive index change of the second refractive optical element due to a temperature fluctuation and a power change at the second refractive optical element by a wavelength change of the light flux emitted by the light source due to a temperature fluctuation.

20. An image forming apparatus comprising:
an optical scanning apparatus according to claim 19;
a photosensitive member arranged on a target scanning face;
a developing device, configured to develop, as a toner image, an electrostatic latent image that is formed on the photosensitive member by a light flux emitted by the optical scanning apparatus;
a transferring device, configured to transfer the toner image to a target material to which the toner image is to be transferred; and
a fixing device, configured to fix the toner image to the target material.

21. An image forming apparatus comprising:
an optical scanning apparatus according to claim 19; and
a printer controller, configured to convert code data received from an external apparatus into image signals and for transmitting the image signals to the optical scanning apparatus.

* * * * *